(12) United States Patent
Hirata et al.

(10) Patent No.: US 7,843,667 B2
(45) Date of Patent: Nov. 30, 2010

(54) THIN FILM MAGNETIC HEAD, HEAD GIMBAL ASSEMBLY, HEAD ARM ASSEMBLY AND MAGNETIC DISK DEVICE

(75) Inventors: Kei Hirata, Tokyo (JP); Norikazu Ota, Tokyo (JP); Yuichi Watabe, Tokyo (JP); Tetsuro Sasaki, Tokyo (JP); Takeo Kagami, Tokyo (JP); Tetsuya Roppongi, Tokyo (JP); Kazuki Sato, Tokyo (JP); Yuji Otsubo, Tokyo (JP); Sohei Horiuchi, Tokyo (JP); Yoshiaki Tanaka, Tokyo (JP); Kenji Yokoyama, Tokyo (JP); Noriaki Kasahara, Tokyo (JP)

(73) Assignee: TDK Corporation, Tokyo (JP)

( * ) Notice: Subject to any disclaimer, the term of this patent is extended or adjusted under 35 U.S.C. 154(b) by 826 days.

(21) Appl. No.: 11/802,219

(22) Filed: May 21, 2007

(65) Prior Publication Data

US 2008/0291582 A1 Nov. 27, 2008

(51) Int. Cl.
*G11B 5/39* (2006.01)
*G11B 5/127* (2006.01)
(52) U.S. Cl. ............... 360/319; 360/123.12; 360/125.3
(58) Field of Classification Search ............ 360/123.11, 360/123.12, 125.02, 125.04, 125.3, 319
See application file for complete search history.

(56) References Cited

U.S. PATENT DOCUMENTS

| | | | |
|---|---|---|---|
| 7,430,098 B1 * | 9/2008 | Song et al. ............... 360/294.7 |
| 7,508,628 B2 * | 3/2009 | Che et al. ............... 360/125.16 |
| 7,518,825 B2 * | 4/2009 | Nishida et al. ........... 360/125.2 |
| 7,599,152 B2 * | 10/2009 | Guan et al. ................ 360/319 |
| 2006/0092565 A1 * | 5/2006 | Ho et al. .................... 360/126 |
| 2006/0092566 A1 * | 5/2006 | Ho et al. .................... 360/126 |
| 2006/0092575 A1 * | 5/2006 | Mochizuki et al. ......... 360/317 |
| 2006/0098335 A1 * | 5/2006 | Hirata et al. ............... 360/125 |
| 2006/0098338 A1 * | 5/2006 | Watabe et al. ............. 360/126 |
| 2006/0139815 A1 * | 6/2006 | Nishida et al. ............. 360/317 |
| 2006/0158779 A1 * | 7/2006 | Ota et al. .................. 360/126 |
| 2006/0164756 A1 * | 7/2006 | Kameda et al. ............ 360/125 |
| 2006/0221499 A1 * | 10/2006 | Tagami et al. ............. 360/126 |
| 2006/0245114 A1 * | 11/2006 | Guan et al. ................ 360/319 |

(Continued)

FOREIGN PATENT DOCUMENTS

| JP | A 2002-092820 | 3/2002 |
|---|---|---|
| JP | A-2005-108412 | 4/2005 |
| JP | A-2006-127740 | 5/2006 |
| JP | A-2007-141288 | 6/2007 |
| JP | A 2007-317245 | 12/2007 |

*Primary Examiner*—William J Klimowicz
(74) *Attorney, Agent, or Firm*—Oliff & Berridge, PLC

(57) ABSTRACT

Provided is a thin film magnetic head capable of suppressing an occurrence of a track erase, decreasing an influence on a magnetoresistive element caused by a magnetic flux generated from a thin film coil, and further decreasing the parasitic capacity. The thin film magnetic head has, in order in a stacked direction, a first magnetic shield layer, a magnetoresistive element, a second magnetic shield layer, a third magnetic shield layer, a main magnetic pole layer and a return yoke layer. A width in a track width direction of at least one of the first and the second magnetic shield layers is smaller than widths in a track width direction of the third magnetic shield layer and the return yoke layer.

12 Claims, 20 Drawing Sheets

U.S. PATENT DOCUMENTS

| | | | |
|---|---|---|---|
| 2006/0268456 A1* | 11/2006 | Sasaki et al. | 360/126 |
| 2006/0291096 A1* | 12/2006 | Sasaki et al. | 360/126 |
| 2007/0139817 A1* | 6/2007 | Hirata et al. | 360/126 |
| 2007/0206323 A1* | 9/2007 | Im et al. | 360/126 |
| 2007/0217069 A1* | 9/2007 | Okada et al. | 360/126 |
| 2007/0230045 A1* | 10/2007 | Hsiao et al. | 360/126 |
| 2007/0253106 A1* | 11/2007 | Sato et al. | 360/126 |
| 2007/0274003 A1* | 11/2007 | Ota et al. | 360/126 |
| 2007/0279802 A1* | 12/2007 | Sasaki et al. | 360/126 |
| 2007/0291409 A1* | 12/2007 | Sasaki et al. | 360/126 |

* cited by examiner

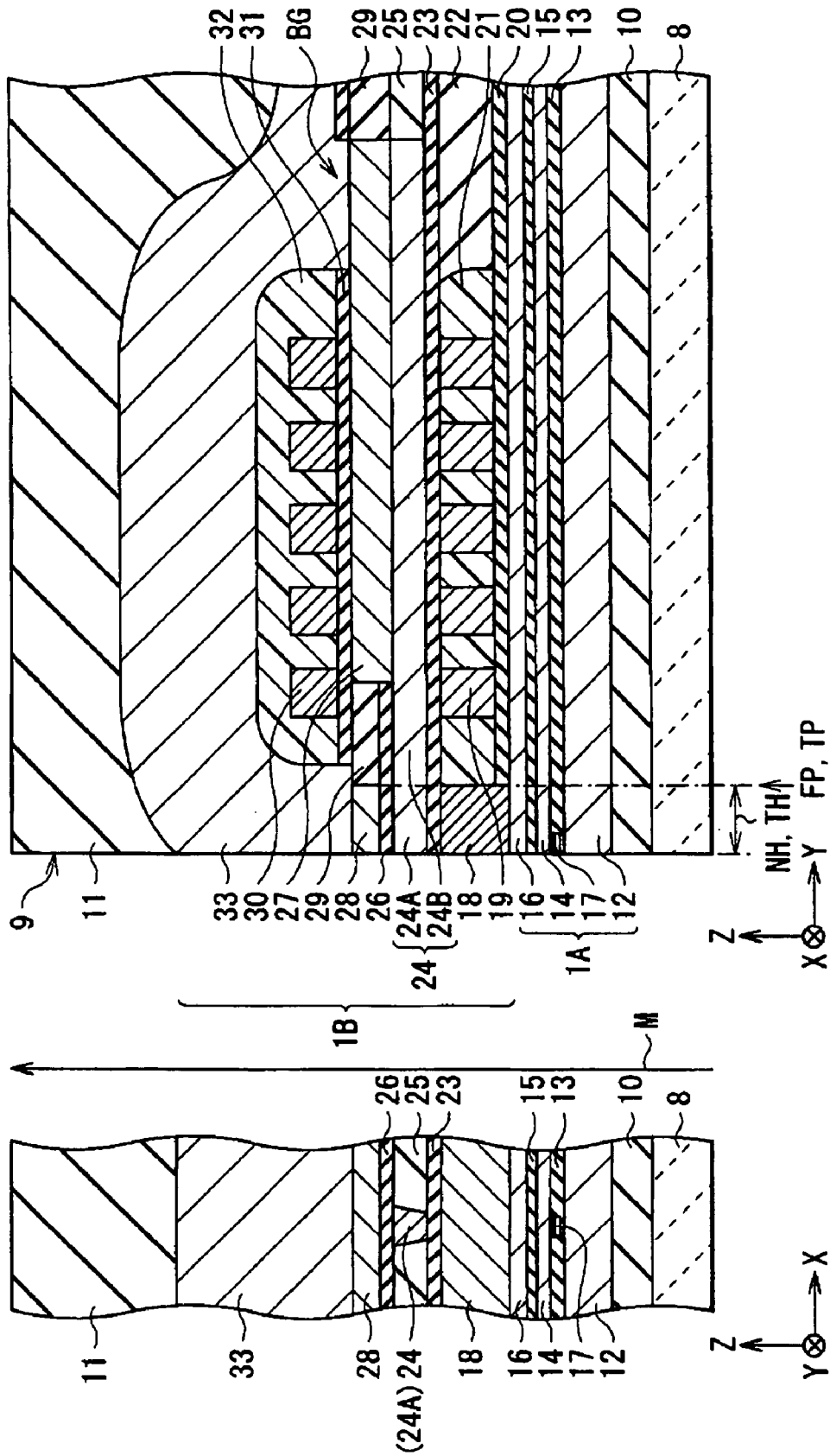

THIN FILM MAGNETIC HEAD, HEAD GIMBAL ASSEMBLY, HEAD ARM ASSEMBLY AND MAGNETIC DISK DEVICE

BACKGROUND OF THE INVENTION

1. Field of the Invention

The present invention relates to a composite thin film magnetic head capable of magnetic process of both reading and writing to a magnetic recording medium, and head gimbal assembly, head arm assembly and magnetic disk device, all equipped with the composite thin film magnetic head.

2. Description of the Related Art

In recent years, with the improvement of a real recording density of a magnetic recording medium (hereinafter, simply referred to as a recording medium) such as a hard disk or the like, the performance improvement of the thin film magnetic head mounted on the magnetic recording device such as hard disk drives is desirable.

As the recording method of the thin film magnetic head, for example, there is known a perpendicular recording method to set the direction of the signal magnetic field to the direction orthogonal to the recording medium surface. In the recording head of the perpendicular recording method, for example, the following is provided: a thin film coil generating the magnetic flux for recording, and a main magnetic pole layer extending backward from the recording-medium-facing surface (hereinafter, simply referred to as an "air bearing surface") and conducting the magnetic flux to the recording medium so that the magnetic medium is magnetized in the direction orthogonal to the recording medium surface. In the recording head, the magnetic medium is magnetized by the magnetic field for recording. Thus information is magnetically recorded on the recording medium.

As the recording head, for example, there is known a recording head provided with a main magnetic pole layer disposed like extending in the direction orthogonal to the air bearing surface. This type of the recording head is generally referred to as a "single pole head". As a specific structure of the simple pole head, for example, there is known a structure that the intensity of the recording magnetic field is increased in order to improve the overwrite properties, and an auxiliary magnetic pole layer for auxiliary magnetic flux accommodation is coupled with the main magnetic pole layer.

Further, for example, recently such a recording head becomes a mainstream that provided with a main magnetic pole layer extending in the direction orthogonal to the air bearing surface as described above to increase the recording density of the recording medium by suppressing the expansion of the recording track width, and a write shield layer to suppress the spread of the magnetic flux released from the main magnetic pole layer. This type of the recording head is generally referred to as a "shield type head". The write shield layer is formed extending backward from the air bearing surface, and the front edge thereof is disposed apart from the main magnetic pole layer with the gap layer in between. As a specific structure of the shield type head, for example, there is known a structure that the write shield layer is disposed on the trailing side of the main magnetic pole layer (Japanese Unexamined Patent Publication No. 2005-108412). In the shield type head provided with the write shield layer, the expansion of the magnetic flux released from the main magnetic pole layer is suppressed so that the gradient of the recording magnetic field is sharply increased; thereby the recording density of the recording medium is improved.

The reproducing head is provided with, for example, a shield gap film, and a pair of lead shield layers to sandwich the shield gap film. A magnetoresistive element including the magnetization free layer changing the magnetization direction according to the signal magnetic field from the magnetic recording medium is buried in the shield gap film. This type of a reproducing head also has a function as a current path that a pair of lead shield layers flow a current in the stacking direction of the magnetoresistive element. Thus the reproducing head reads the recorded information by using the change of the electric resistance of the magnetoresistive element according to the signal magnetic field from the magnetic recording medium.

SUMMARY OF THE INVENTION

In the above recording head, a phenomenon (track erase) may occur that signals recorded on the track other than the recording target track are erased because of the write shield layer. Thus, for example, there is proposed a method to provide a projection projected on the main magnetic pole layer side, only in the part facing the main magnetic pole layer of the write shield layer (Japanese Unexamined Patent Publication No. 2002-92820). However, the width in a track width direction of the main magnetic pole layer is extremely small and the volume of the projection is extremely small so that much of the magnetic flux released from the main magnetic pole layer is thought to be absorbed by the part other than the projection of the write shield layer. Thus, even if such a fine projection is provided in the write shield layer, an effect to suppress the occurrence of the track erase is thought to be limited.

Also, in the above reproducing head, the current is supplied to the magnetoresistive element via the pair of lead shield layers so that the frequency band width of the reproducing head may be decreased according to the parasite capacitance occurred in the lead shield layer. Thus, for example, the facing area of the pair of the lead shield layer may be decreased. However, if the facing area of the pair of the lead shield layer is simply decreased, an influence of the magnetic flux generated from the thin film coil of the recording head likely extends to the magnetoresistive element.

In view of the foregoing, it is desirable to provide a thin film magnetic head capable of suppressing the occurrence of the track erase, also decreasing the influence on the magnetoresistive element, caused by the magnetic flux generated from the thin film coil, and further decreasing the parasite volume, and head gimbal assembly, head arm assembly and magnetic disk device, all equipped with thereof.

A magnetoresistive element according to an embodiment of the present invention has a magnetoresistive element, a first magnetic shield layer, a second magnetic shield layer, a thin film coil generating a magnetic flux, a main magnetic pole layer, and a third magnetic shield layer and a return yoke layer. Here, the magnetoresistive element has a stacked structure to detect a signal magnetic field from the magnetic recording medium. The first magnetic shield layer is provided on one side of the magnetoresistive element in the stacked direction and the second magnetic shield layer is provided on the other side of the magnetoresistive element. The main magnetic pole layer is provided on the opposite side of the second magnetic shield layer from the magnetoresistive element and disposed adjacent to the thin film coil and conducts the magnetic flux generated in the thin film coil to the magnetic recording medium so that the magnetic recording medium is magnetized in the direction orthogonal to its surface. The third magnetic shield layer is provided between the main magnetic pole layer and the second magnetic shield layer. The return yoke layer is provided on the opposite side of the third magnetic shield layer from the main magnetic pole layer. A width in the track width direction of at least one of the first and the second magnetic shield layers is smaller than widths in the track width direction of the third magnetic shield layer and the return yoke layer.

Also, the head gimbal assembly according to an embodiment of the present invention has a magnetic head slider provided with the thin film magnetic head on one side, and a suspension with the magnetic head slider attached on one end. The head arm assembly according to an embodiment of the present invention has the head gimbal assembly and an arm supporting the other end of the suspension. Further, the magnetic disk device according to an embodiment of the present invention has the magnetic recording medium and the head arm assembly.

The thin film magnetic head, the head gimbal assembly, the head arm assembly and the magnetic disk device according to an embodiment of the present invention is provided with a third magnetic shield layer between the thin film coil and the main magnetic pole layer, and the magnetoresistive element, separately from the second magnetic shield layer. Thus a width of the third magnetic shield layer can be set without affecting the frequency band width of the reproducing head; thereby propagation of the magnetic flux generated from the thin film coil, to the magnetoresistive element is prevented by setting the width of the third magnetic shield layer appropriately. Also, because the width in the track width direction of at least one of the first magnetic shield layer and the second magnetic shield layer is smaller than the widths in the track width direction of the third magnetic shield layer and the return yoke layer; thereby the facing area of the first magnetic shield layer and the second magnetic shield layer can be decreased. Also, it can be said that the widths in the track width direction of the third magnetic shield layer and the return yoke layer are larger than the width in the track width direction of at least one of the first and the second magnetic shield layers. Thus the magnetic field component in the direction perpendicular to the air bearing surface is dispersed when they are absorbed in the third magnetic shield layer and the return yoke layer and a local concentration can be eased. Therefore, the occurrence of track erase can be suppressed. Further, the parasite volume occurred by the first and the second magnetic shield layers can be decreased while the influence of the magnetic flux generated from the thin film coil, on the magnetoresistive element is decreased.

Here, each of the third magnetic shield layer and the return yoke layer has an exposed region in the center of the track width direction exposed to the air bearing surface, and has cutaway portions on both ends in the track width direction on the air bearing surface side. In this case, the magnetic field component in the direction perpendicular to the air bearing surface can be eased from being locally concentrated to the edge of the third magnetic shield layer and the return yoke layer; thereby the track erase can be further suppressed. Also the second magnetic shield layer may have an exposed region in the center of the track width direction exposed to the air bearing surface, and has cutaway portions on both ends in the track width direction on the air bearing surface side.

The thin film coil has a lower thin film coil provided between the main magnetic pole layer and the third magnetic shield layer, and an upper thin film coil provided between the main magnetic pole layer and return yoke layer. Also a fourth magnetic shield layer is provided between the main magnetic pole layer and the third magnetic shield layer on the air bearing side of the lower thin film coil. Further, the fourth magnetic shield layer is coupled to the third magnetic shield layer. In this case, a spread of the magnetic flux released from the main magnetic pole layer is suppressed by the fourth magnetic shield layer so that the gradient of the recording magnetic field is sharply increased; thereby the recording density of the recording medium is improved. Each of the fourth magnetic shield layer and at least one of the first and the second magnetic shield layers has an exposed region in the center of the track width direction exposed to the air bearing surface. At this time, when the width in the track width direction of the exposed region of at least one of the first and the second magnetic shield layers is substantially equal to or smaller than that of the exposed region of the fourth magnetic shield layer, the parasitic capacity occurred by the first and the second magnetic shield layers can be decreased. At this time, the width in the track width direction of the fourth magnetic shield layer is substantially equal to or larger than the width in the track width direction of at least one of the first and the second magnetic shield layers so that the magnetic field components in the direction perpendicular to the air bearing surface are dispersed when they are absorbed in the fourth magnetic shield layer, and the local concentration is eased. Thus the occurrence of the track erase can be suppressed.

The thin film magnetic head may be formed in a manner that each of the first to the fourth magnetic shield layer and the return yoke layer has an exposed portion exposed to the air bearing surface, and widths in the track width direction of the exposed portions are equal to each other. Also, the first and the second magnetic shield layer is smaller than the third and the fourth magnetic shield layers and the return yoke layer in total width in the track width direction.

Also, in case each of the first and fourth magnetic shield layer and the return yoke layer has an exposed portion exposed to the air bearing surface, the widths in the track width direction of the exposed portions of the first to the fourth magnetic shield layers and the return yoke layer are gradually increased toward the first magnetic shield layer side from the return yoke layer side. The external magnetic field can be released to the first magnetic shield layer. At this time, at least the first magnetic shield layer of the first to the fourth magnetic shield layers and the return yoke layer have chamfered faces extending backward from both ends of the exposed region in the track width direction to the outside. Each of the cutaway portions has a chamfered face extending from the central area to both of the side faces. Further, when the angle between the air bearing surface and the chamfered face is equal to or above 8 degrees and equal to or below 40 degrees, the track erase caused by the external magnetic field can be suppressed.

Other and further objects, features and advantages of the invention will appear more fully from the following description.

BRIEF DESCRIPTION OF THE DRAWINGS

FIG. 4A is an exploded side configuration view partially showing a part of the thin film magnetic head of FIG. 3, exposed on an air bearing surface.

FIG. 4B is a sectional configuration view as viewed from the direction of an arrow A-A of the thin film magnetic head of FIG. 3.

DETAILED DESCRIPTION OF THE PREFERRED EMBODIMENT

Hereinafter, a preferred embodiment of the present invention will be described in detail with reference to the accompanying drawings.

With reference to FIGS. 1 to 24, configuration of a thin film magnetic head 1, and a head gimbal assembly 2, a head arm assembly 300 and a magnetic disk device, all equipped with the thin film magnetic head 1, according to the embodiment of the present invention will be described below.

Figure 1:
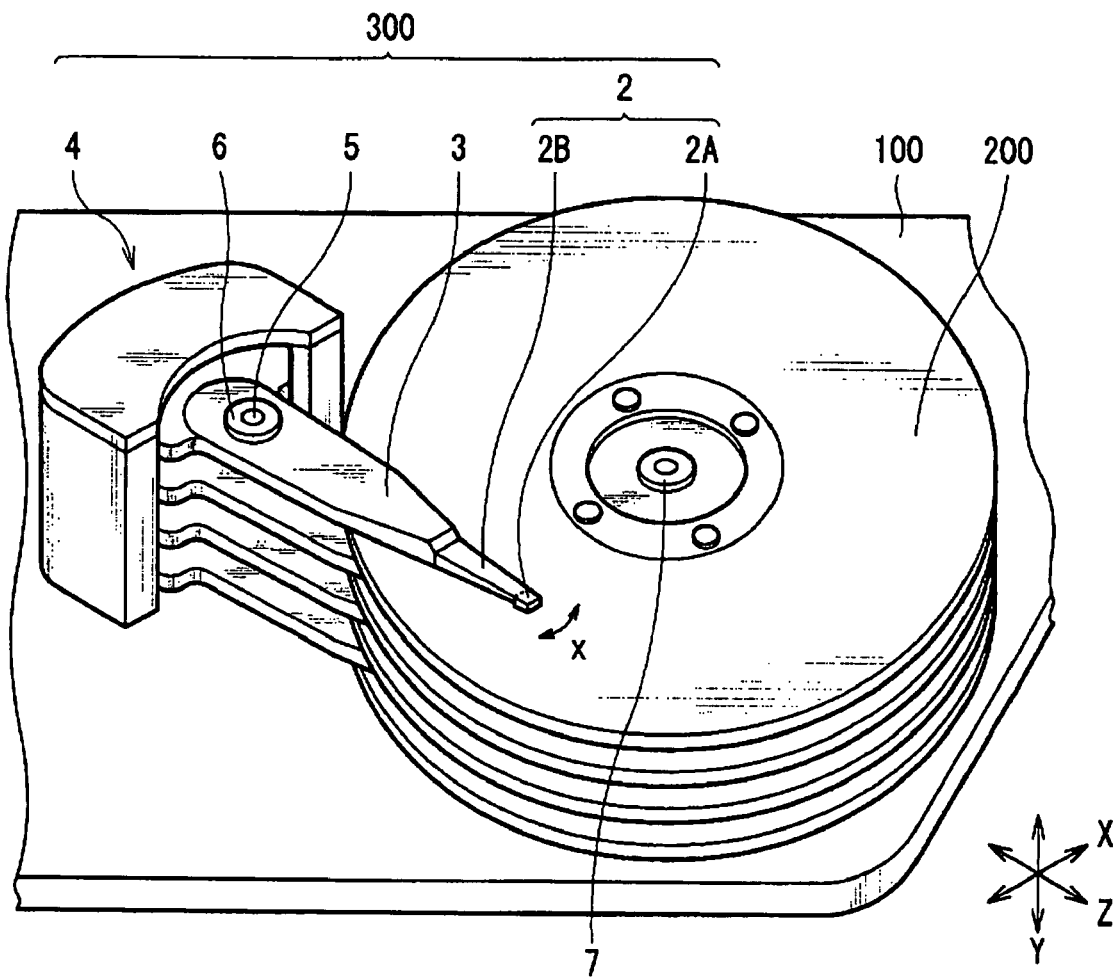
FIG. 1 is a perspective view showing an internal configuration of a magnetic disk device according to an embodiment of the present invention.

FIG. 1 is a perspective view showing an example of an inner configuration of the magnetic disk device according to the present embodiment. In a housing 100, the magnetic disk device has, for example as in FIG. 1, one or more (four in FIG. 1) magnetic recording media 200 (such as hard disks) capable of recording information, and a head arm assembly (HAA) 300 to record the information on the magnetic recording medium 200 and to reproduce the information.

The HAA 300 has, for example, a head gimbal assembly (HGA) 2, an arm 3 and a drive section 4. The HGA 2 has a magnetic head slider (hereinafter, simply referred to as a "slider") 2A disposed in correspondence with the recording surface (the surface or the back) of the magnetic recording medium 200, and a suspension 2B attached at an end of the slider 2A. The arm 3 has a configuration rotatable via a bearing 6 about a fixed axis 5 fixed to the housing 100, and supports the other end (the end opposite to the slider 2A) of the suspension 2B. Thus the slider 2A is movable in the track width direction (X-axis direction) of the magnetic recording medium 200 in a face parallel to the recording surface of each magnetic recording medium 200. The drive section 4 is a power source to pivot the arm 3, and is configured of a voice coil motor or the like.

The magnetic recording medium 200 is supported to be rotatable about a spindle motor 7 fixed to the housing 100, in the direction substantially orthogonal to the X-axis direction. Thus the information is recorded on the magnetic recording medium 200 by a rotation of the magnetic recording medium 200 and a travel of the slider 2A, or the recorded information is reproduced.

Figure 2:
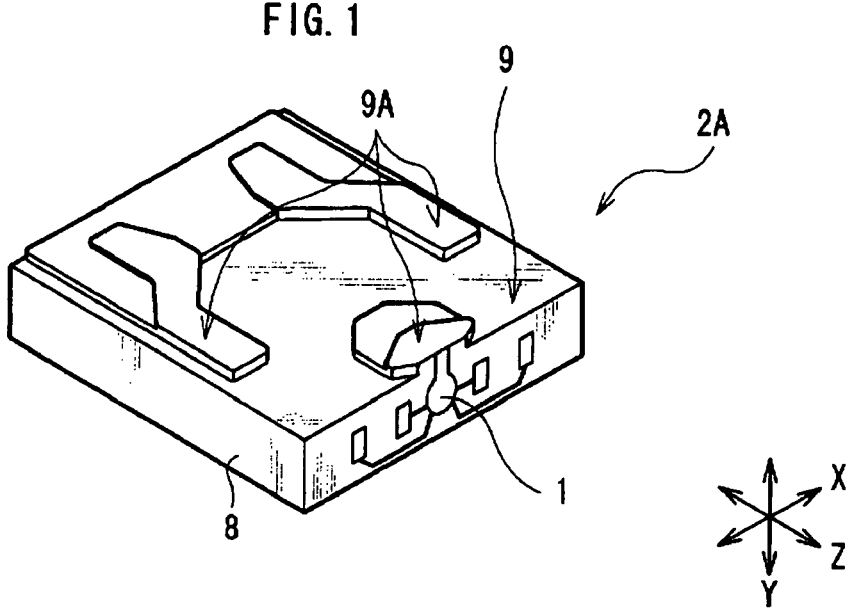
FIG. 2 is a perspective view showing a configuration of a slider of FIG. 1.

FIG. 2 shows an example of a configuration of the slider 2A shown in FIG. 1. The slider 2A has a base 8 of a block shape formed of ceramic materials such as Altic ($Al_2O_3.TiC$). The base 8 is formed in, for example, almost a hexahedron shape, and one face of the six faces is disposed to oppose the recording surface of the magnetic recording medium 200 close to thereof. An air bearing surface 9 is a surface opposed to the recording surface of the magnetic recording medium 200. The air bearing surface 9 is provided with a rail 9A to generate a lift by the air flow in the displacement direction (Z-axis direction) of the magnetic recording medium 200, the air flow occurred between the recording surface and air bearing surface 9 when the magnetic recording medium 200 is rotated. In addition, FIG. 2 shows a case that the rails 9A are provided at the central area in the X-axis direction of the inflow side of the air flow in the slider 2A, and on both side faces in the X-axis direction of the outflow side of the air flow in the slider 2A, respectively.

When the magnetic recording medium 200 is rotated, a certain space is made between the air bearing surface 9 and the magnetic recording medium 200 by the lift due to the air flow generated in the Z-axis direction between the recording surface and air bearing surface 9.

Figure 3:
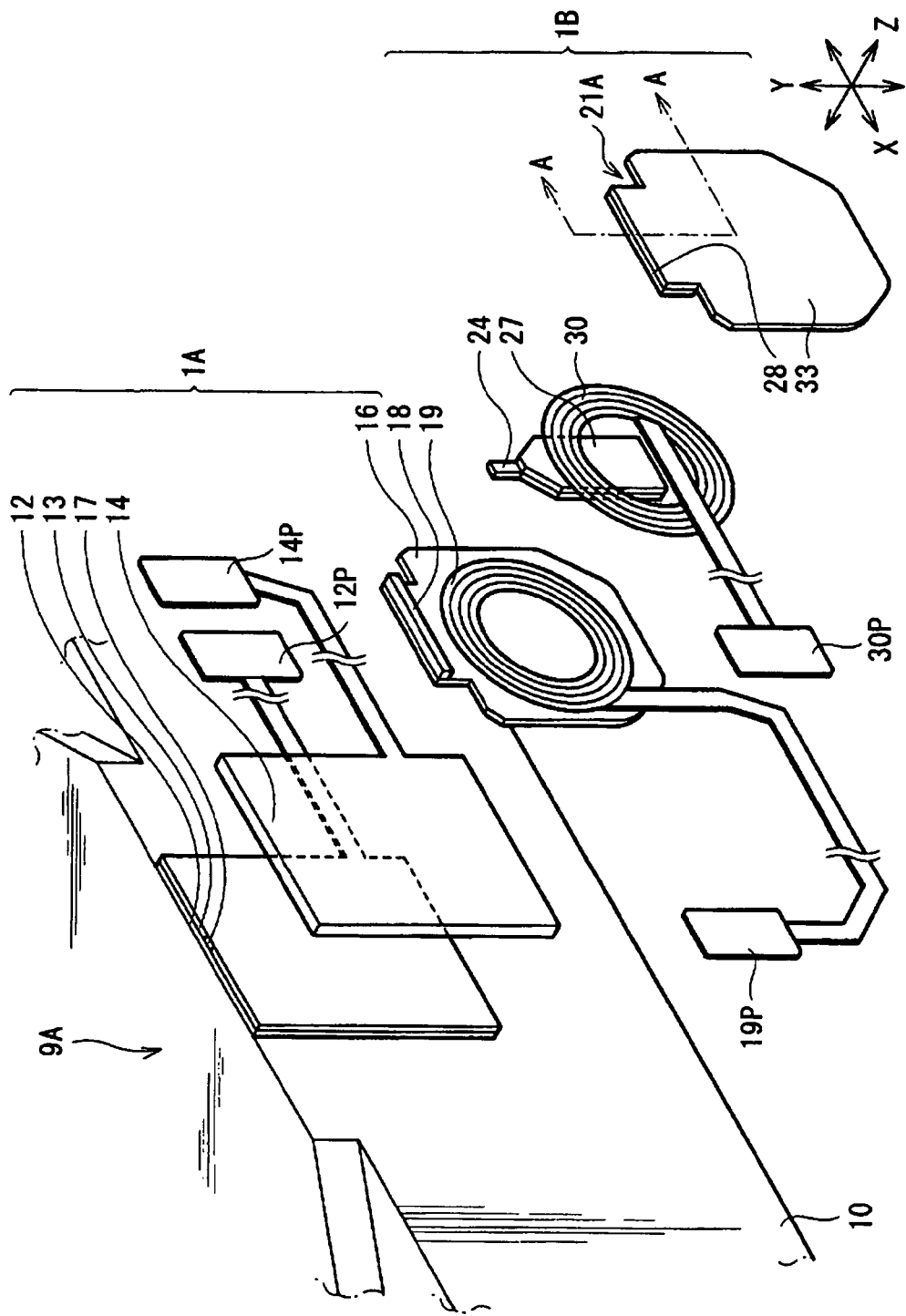
FIG. 3 is an exploded perspective view showing a configuration of a thin film magnetic head of FIG. 2

FIG. 3 is an exploded perspective view showing an example of a configuration of the thin film magnetic head 1. FIG. 4A is an enlarged plan configuration view partially showing a portion exposed on the air bearing surface 9 of the thin film magnetic head 1 of FIG. 3. Also, FIG. 4B is a cross sectional configuration view as viewed from the direction of A-A of FIG. 3. As in FIGS. 3, 4A and 4B, the thin film magnetic head 1 performs magnetic operation of the magnetic recording medium 200 and is a composite head capable of magnetic operation of both writing and reading.

On the base 8, the thin film magnetic head 1 has a configuration that, for example, an insulating layer 10, a reproducing head portion 1A reproducing the magnetic information recorded on the magnetic recording medium 200 using Magnetoresistive (MR) effect, a recording head portion 1B recording in the perpendicular recording method, and an overcoat layer 11 are stacked in this order. In FIG. 3, the overcoat layer 11 is not shown.

The insulating layer 10 and the overcoat layer 11 are formed of non-magnetic insulating materials such as aluminum oxide ($Al_2O_3$) or aluminum nitride (AlN).

As shown in FIGS. 3, 4A and 4B, the reproducing head portion 1A has a configuration that, for example, on the insulating layer 10, a lower lead shield layer 12 (the first magnetic shield layer), a shield gap film 13, an upper first lead shield layer 14 (the second magnetic shield layer), a separating layer 15, and an upper second lead shield layer 16 (the third magnetic shield layer) are stacked in this order. In the shield gap film 13, an MR element 17 is buried so as to be exposed on the air bearing surface 9.

The lower lead shield layer 12 and the upper first lead shield layer 14 avoid the influence of unnecessary magnetic fields on the MR element 17, respectively. They are formed of magnetic metal materials such as nickel-iron alloy (NiFe). The lower lead shield layer 12 and the upper first lead shield layer 14 extend in the Y-axis direction from the air bearing surface 9. One end of each of them is exposed on the air bearing surface 9. That is, the lower lead shield layer 12 and the upper first lead shield layer 14 are disposed oppositely in the stacked direction (the Z-axis direction) with the MR element 17 in between.

Figure 5A:
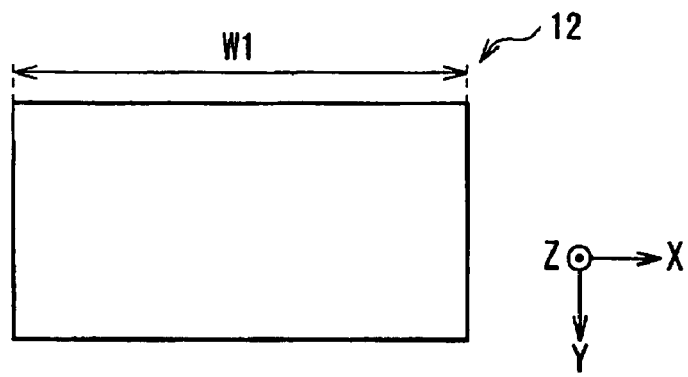
FIG. 5A is a plan configuration view showing an example of a lower lead shield layer 12 of FIG. 4B.
Figure 5B:
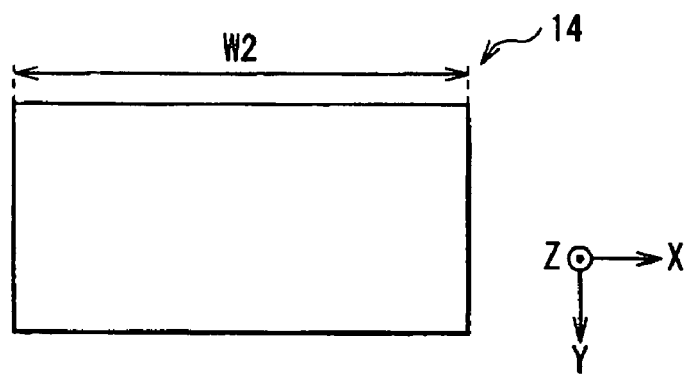
FIG. 5B is a plan configuration view showing an example of an upper first lead shield layer 14 of FIG. 4B.
Figure 6A:
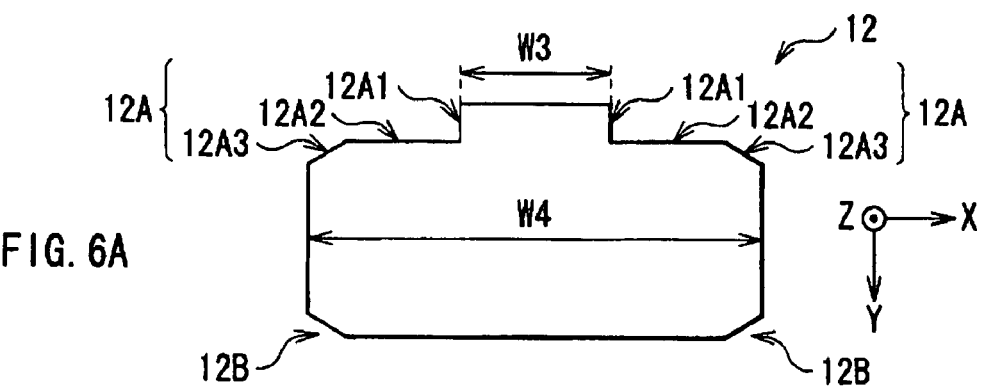
FIG. 6A is a plan configuration view showing another example of the lower lead shield layer 12 of FIG. 5A.
Figure 6B:
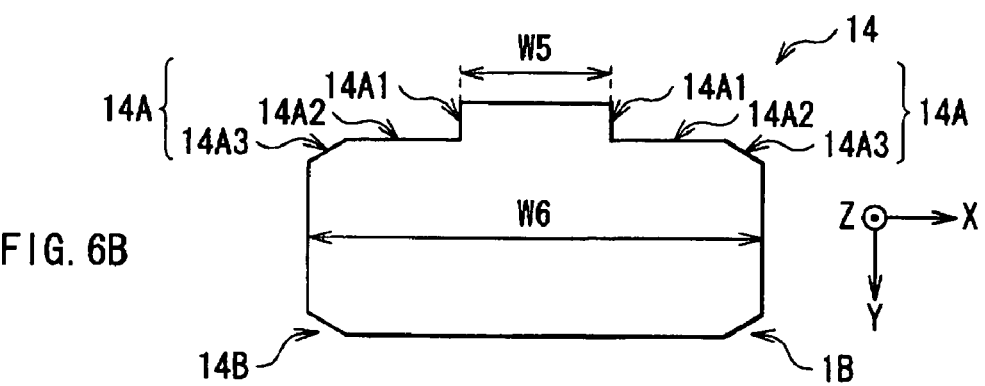
FIG. 6B is a plan configuration view showing another example of the upper first lead shield layer 14 of FIG. 5B.

For example, in the lower lead shield layer 12, a width on the air bearing surface side in the X-axis direction may have a planar configuration of a rectangular shape with a width W1 as shown in FIGS. 3, 5A and 5B, or may have a planar configuration of almost a battledore shape as in FIGS. 6A and 6B. Also in the upper first lead shield layer 14, a width on the air bearing surface side in the X-axis direction may have a planar configuration of a rectangular shape with a width W2, or may have a planar configuration of almost a battledore shape. With a consideration for enhancing the stability of the magnetic domain structure, in the cross section parallel to the X-Y plane of the lower lead shield layer 12 and the upper first lead shield layer 14, the width in the X-axis direction is preferably equal to or larger than the width in the Y-axis direction. FIGS. 5A and 5B show an example of the planar configuration of the lower lead shield layer 12 and the upper first lead shield layer 14. FIGS. 6A and 6B show another example of the planar configuration of the lower lead shield layer 12 and the upper first lead shield layer 14.

Figure 7A:
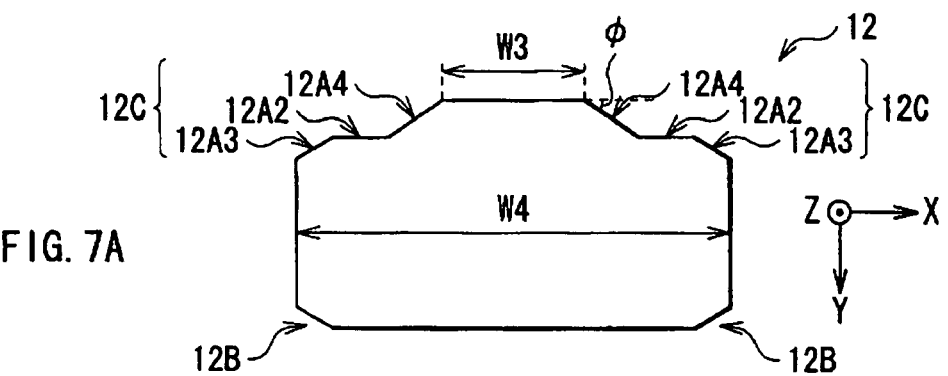
FIG. 7A is a plan configuration view showing still another example of the lower lead shield layer 12 of FIG. 5A.
Figure 7B:
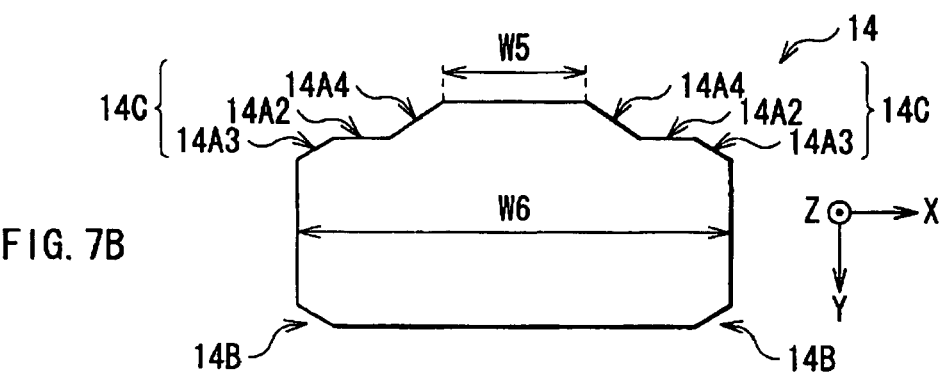
FIG. 7B is a plan configuration view showing still another example of the upper first lead shield layer 14 of FIG. 5B.
Figure 8A:
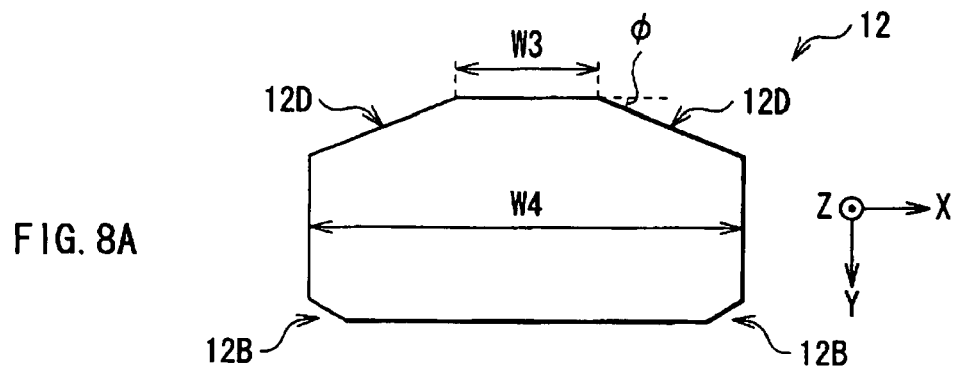
FIG. 8A is a plan configuration view further showing still another example of the lower lead shield layer 12 of FIG. 5A.
Figure 8B:
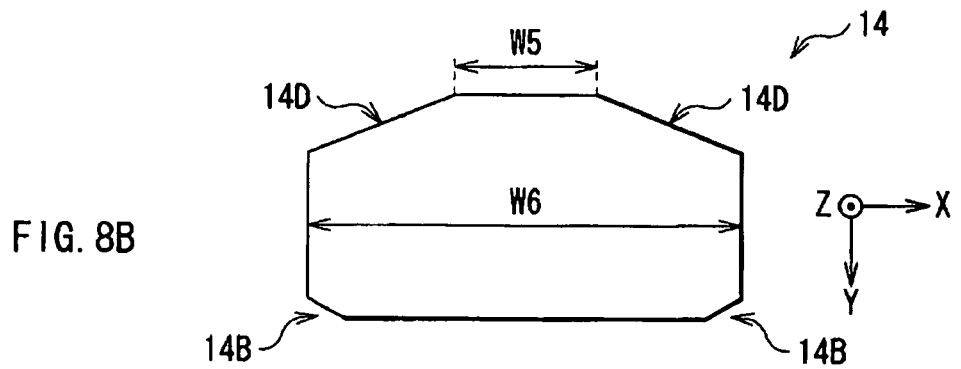
FIG. 8B is a plan configuration view further showing still another example of the upper first lead shield layer 14 of FIG. 5B.
Figure 9A:
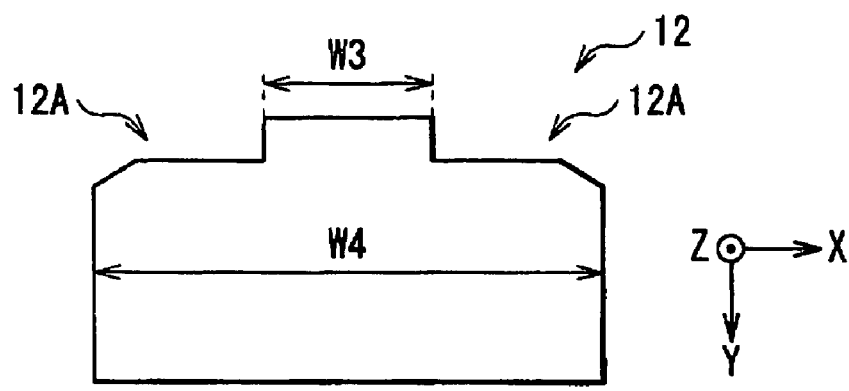
FIG. 9A is a plan configuration view further showing still another example of the lower lead shield layer 12 of FIG. 5A.
Figure 9B:
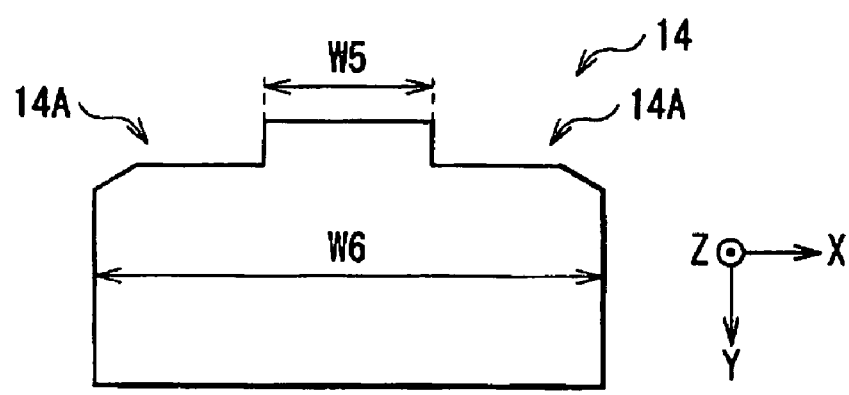
FIG. 9B is a plan configuration view further showing still another example of the upper first lead shield layer 14 of FIG. 5B.
Figure 10A:
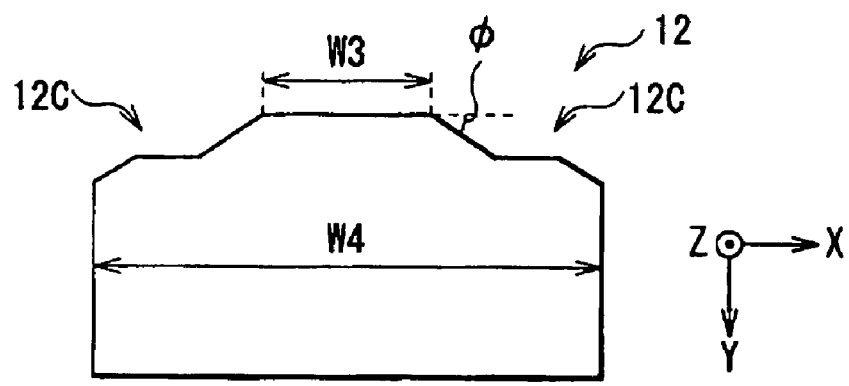
FIG. 10A is a plan configuration view further showing still another example of the lower lead shield layer 12 of FIG. 5A.
Figure 10B:
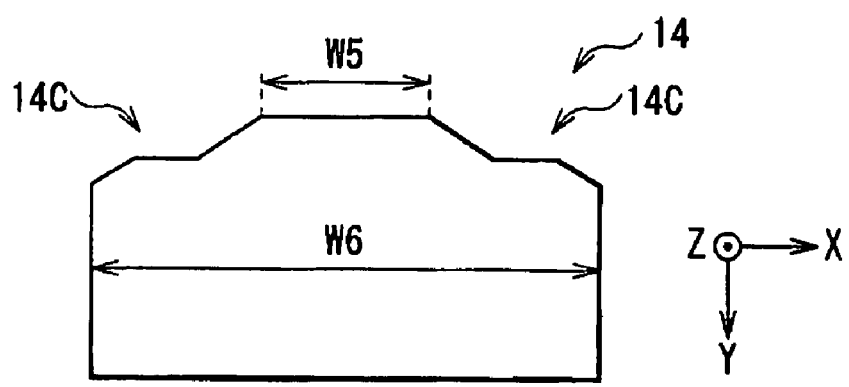
FIG. 10B is a plan configuration view further showing still another example of the upper first lead shield layer 14 of FIG. 5B.
Figure 11A:
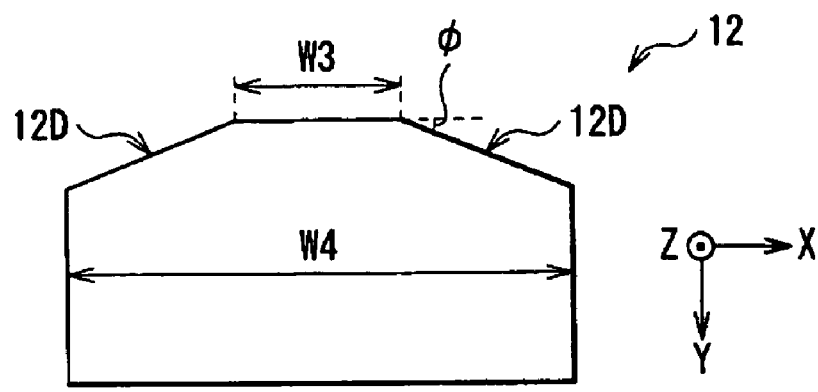
FIG. 11A is a plan configuration view further showing still another example of the lower lead shield layer 12 of FIG. 5A.
Figure 11B:
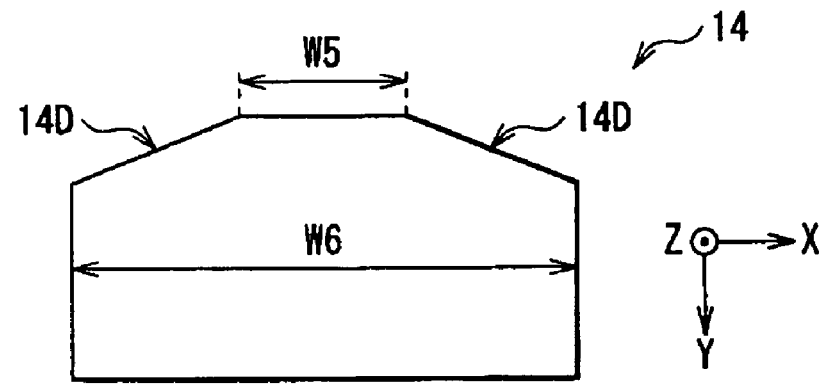
FIG. 11B is a plan configuration view further showing still another example of the upper first lead shield layer 14 of FIG. 5B.

Here, almost a battledore shape indicates that, for example, in the lower lead shield layer 12, a width W3 on the air bearing surface side in the X-axis direction is smaller than a width W4 of the part recessed from the air bearing surface 9 in the X-axis direction. Also in the upper first lead shield layer 14, a width W5 on the air bearing surface side in the X-axis direction is smaller than a width W6 of the part recessed from the air bearing surface 9 in the X-axis direction. However, cutaway portions may be provided from the central area in the X-axis direction of the facing area of the magnetic recording medium 200, to both side faces orthogonal to the X-axis direction of the magnetic recording medium 200. Also cutaway portions may be provided as well from the central area in the X-axis direction of the part opposite to the facing area of the magnetic recording medium 200, to both side faces orthogonal to the X-axis direction of the magnetic recording medium 200. For example as shown in FIGS. 6A and 6B, a pair of cutaway portions 12A (14A) may be provided in the following way. The central area in the X-axis direction of the facing area of the magnetic recording medium 200 is sandwiched by a pair of first end faces 12A1 (14A1) extending orthogonal to the air bearing surface 9. Also, the pair of the first end faces 12A1 (14A1) are sandwiched by a pair of second end faces 12A2 (14A2) extending parallel to the air bearing surface 9 from the edge opposite to the air bearing surface 9 of each of the first end faces 12A1 (14A1). Finally, the pair of the second end faces 12A2 (14A2) is sandwiched by a pair of third edges 12A3 (14A3) extending in the direction inclined to the air bearing surface 9 from edges opposite to the first end faces 12A1 (14A1) of each of the second end faces 12A2 (14A2). A pair of cutaway portions 12B (14B) may be provided as well extending in the direction inclined to the air bearing surface 9, on both side faces in the X-axis direction of the part opposite to the facing area of the magnetic recording medium 200. In addition, for example as shown in FIGS. 7A and 7B, cutaway portions 12C (14C) may be provided with a pair of the fourth end faces 12A4 (14A4) in substitution for the pair of first end faces 12A1 (14A1) of the cutaway portion 12A (14A), extending in the direction inclined to the air bearing surface 9. Also, for example as shown in FIGS. 8A and 8B, a pair of cutaway portions 12D (14D) may be provided extending in the direction inclined to the air bearing surface 9, from the central area in the X-axis direction of the facing area of the magnetic recording medium 200, to both side faces orthogonal to the X-axis direction of the magnetic recording medium 200. Also, for example as shown in FIGS. 9A, 9B, 10A, 10B, 11A and 11B, the pair of the cutaway portions 12B (14B) are not provided but only the cutaway portions 12A (14A), 12C (14C) and 12D (14D) may be provided.

The shield gap film 13 electrically separates the MR element 17 from its periphery, and is formed of the non-magnetic insulating materials such as aluminum oxide, aluminum nitride or the like. Also, the separating layer 15 is formed of the non-magnetic insulating materials such as aluminum oxide, the aluminum nitride or the like. In addition, in case the MR element 17 has a Current in Plane (CIP) configuration, the separating layer 15 may be formed of metal materials.

Figure 12A:
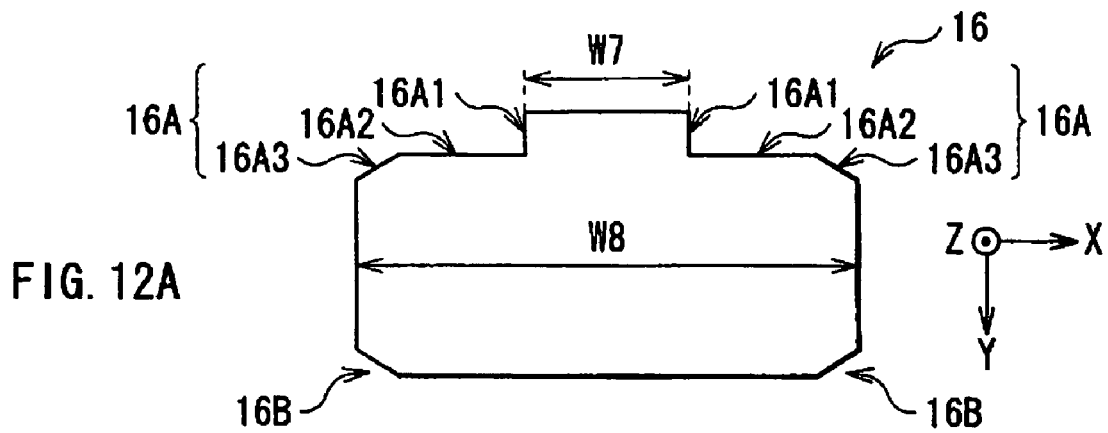
FIG. 12A is a plan configuration view showing an example of an upper second lead shield layer 16 of FIG. 4B.

The upper second lead shield layer 16 absorbs the unnecessary magnetic flux released from a lower thin film coil 19 and a main magnetic pole layer 24 in order to prevent the unnecessary magnetic flux getting into the reproducing head portion 1A. The upper second lead shield layer 16 is formed of magnetic metal materials such as nickel-iron alloy (NiFe). The upper second lead shield layer 16 has a planar configuration of almost a battledore shape as shown in FIGS. 3 and 12A. FIG. 12A shows an example of a planar configuration of the upper second lead shield layer 16.

Figure 12B:
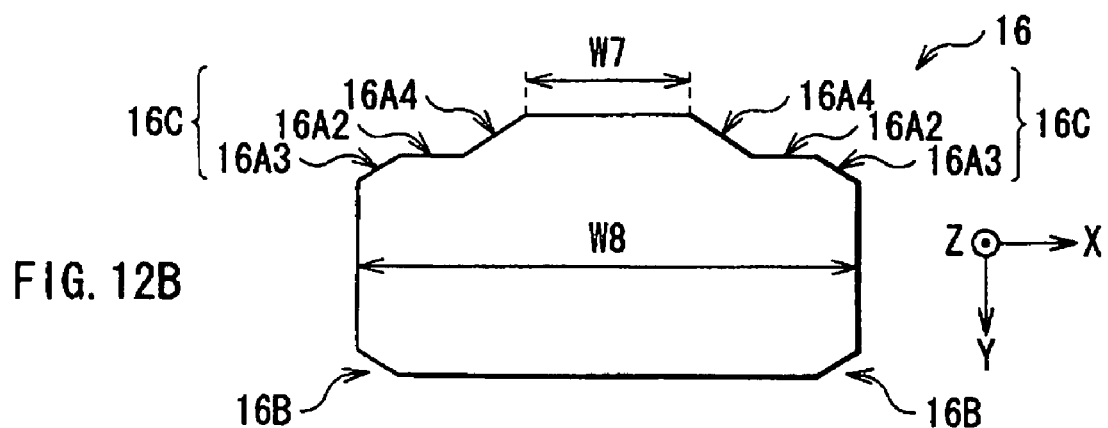
FIG. 12B is a plan configuration view showing another example of the upper second lead shield layer 16 of FIG. 4B.
Figure 12C:
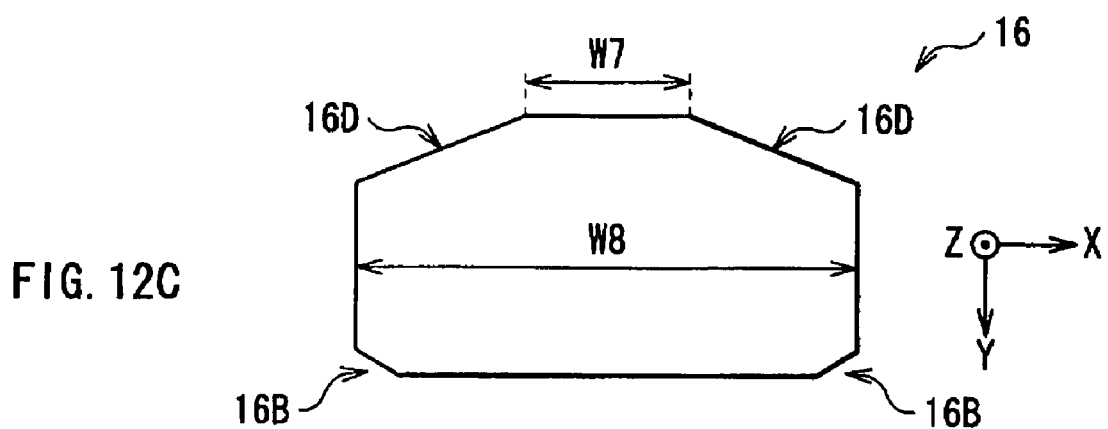
FIG. 12C is a plan configuration view showing still another example of the upper second lead shield layer 16 of FIG. 4B.
Figure 13A:
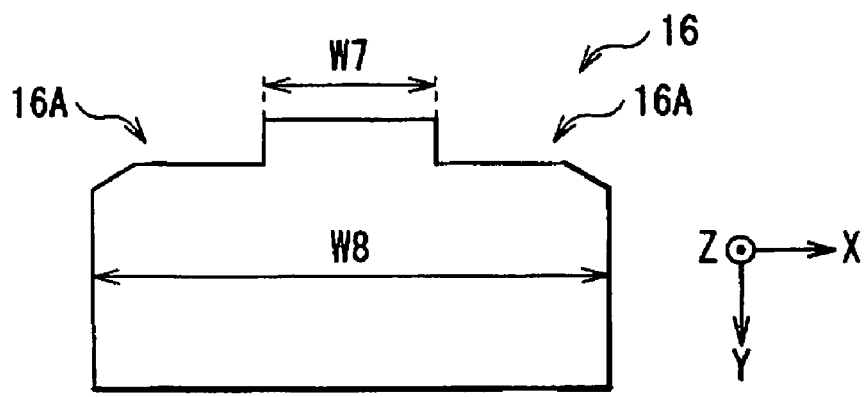
FIG. 13A is a plan configuration view further showing still another example of the upper second lead shield layer 16 of FIG. 4B.
Figure 13B:
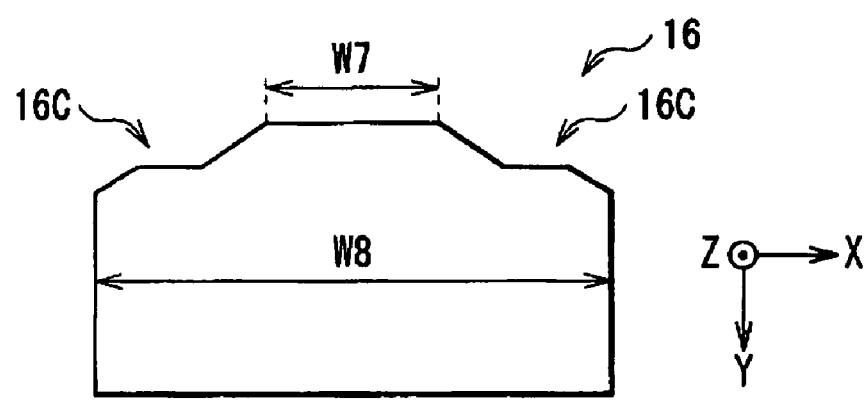
FIG. 13B is a plan configuration view further showing still another example of the upper second lead shield layer 16 of FIG. 4B.
Figure 13C:
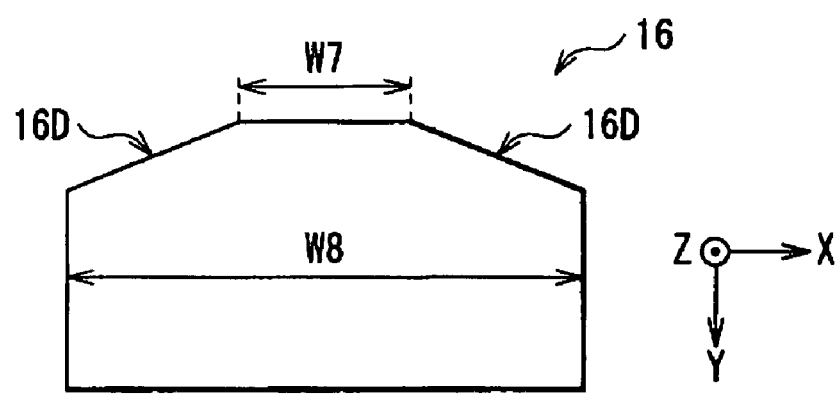
FIG. 13C is a plan configuration view further showing still another example of the upper second lead shield layer 16 of FIG. 4B.
Figures 14A, 14B, 14C:
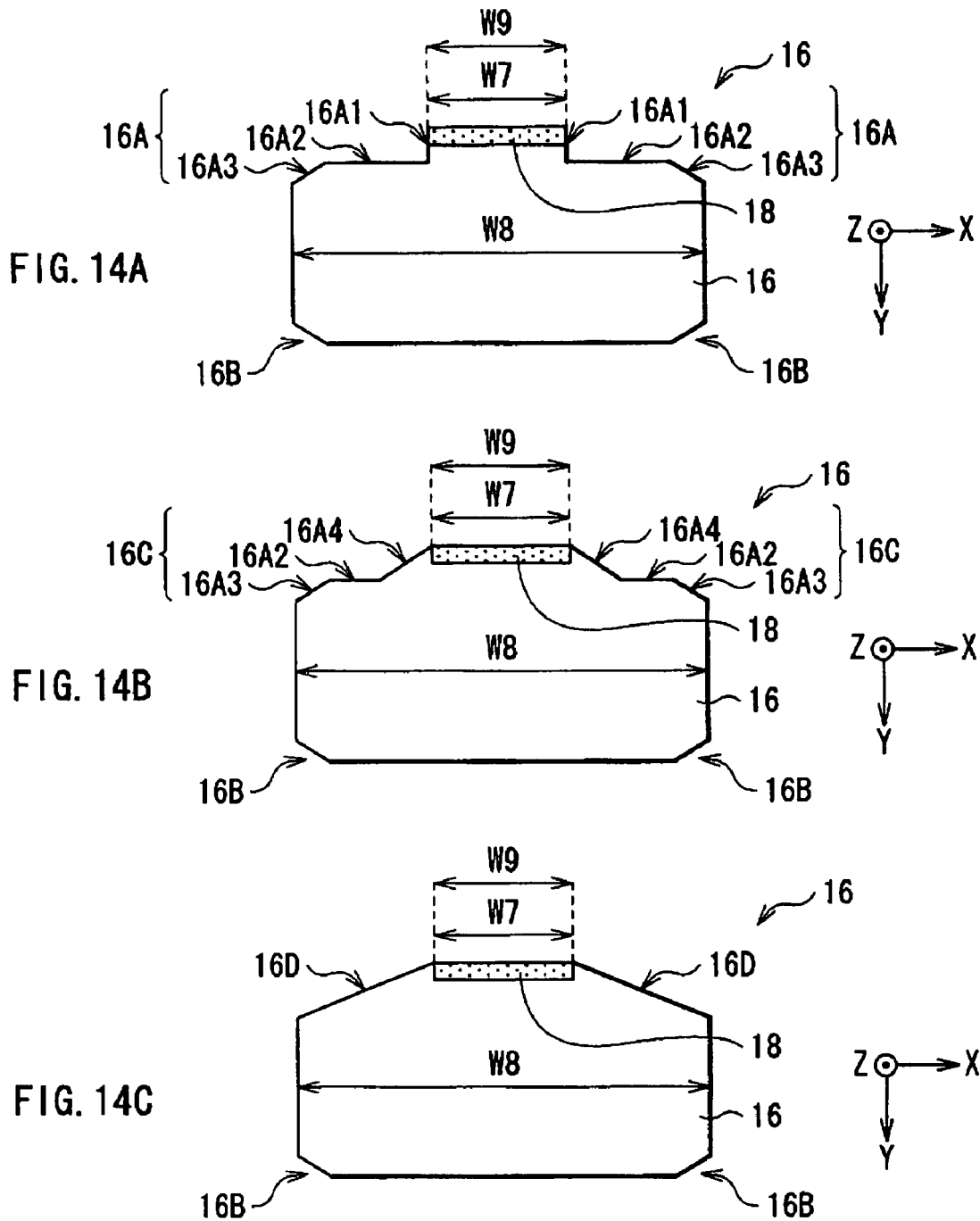
FIG. 14A is a plan configuration view showing an example of an LS layer 18 of FIG. 4B.
FIG. 14B is a plan configuration view showing another example of the LS layer 18 of FIG. 4B.
FIG. 14C is a plan configuration view showing still another example of the LS layer 18 of FIG. 4B.
Figure 15A:
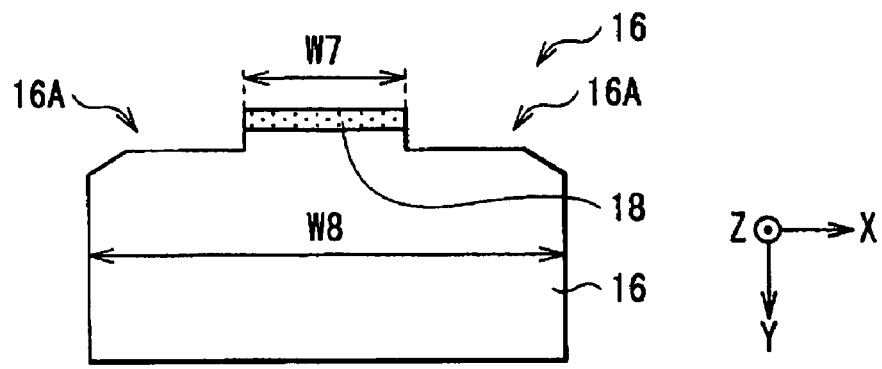
FIG. 15A is a plan configuration view further showing another example of the LS layer 18 of FIG. 4B.
Figure 15B:
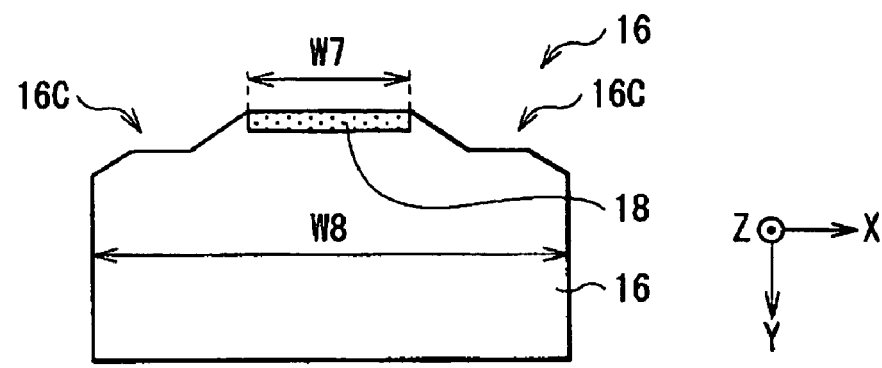
FIG. 15B is a plan configuration view further showing still another example of the LS layer 18 of FIG. 4B.
Figure 15C:
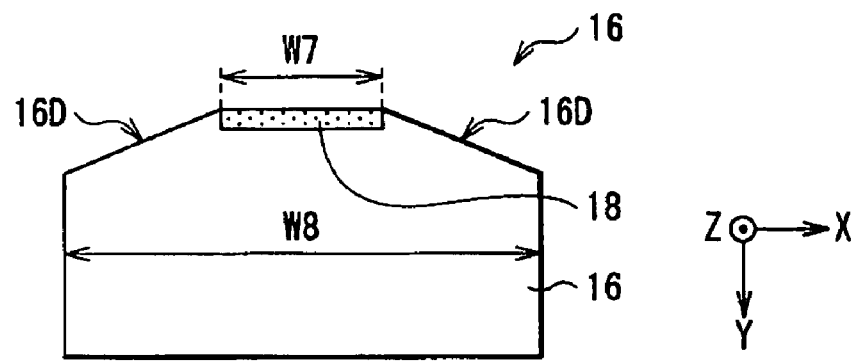
FIG. 15C is a plan configuration view further showing still another example of the LS layer 18 of FIG. 4B.
Figure 16A:
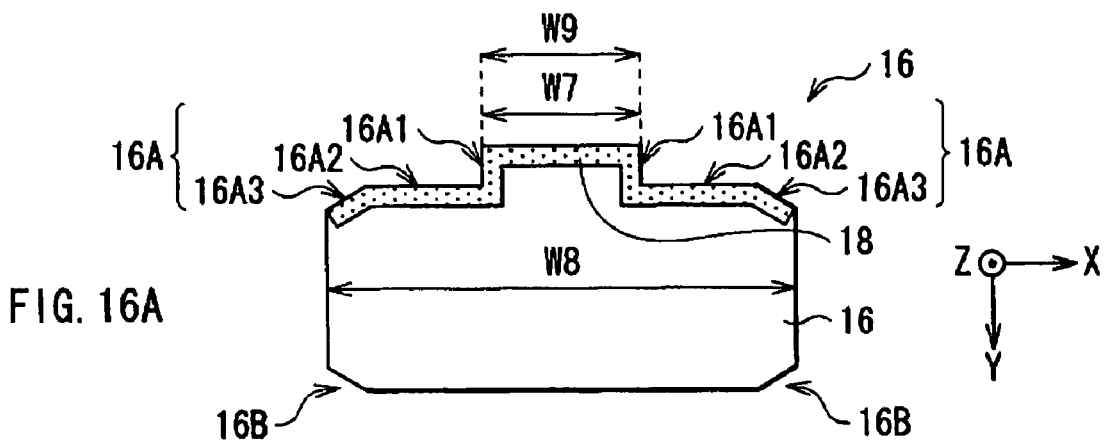
FIG. 16A is a plan configuration view further showing still another example of the LS layer 18 of FIG. 4B.
Figure 16B:
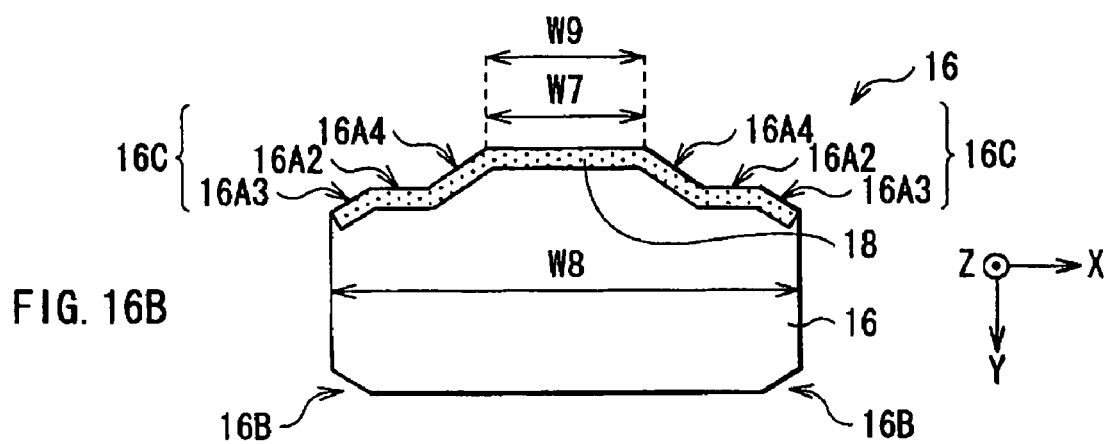
FIG. 16B is a plan configuration view further showing still another example of the LS layer 18 of FIG. 4B.
Figure 16C:
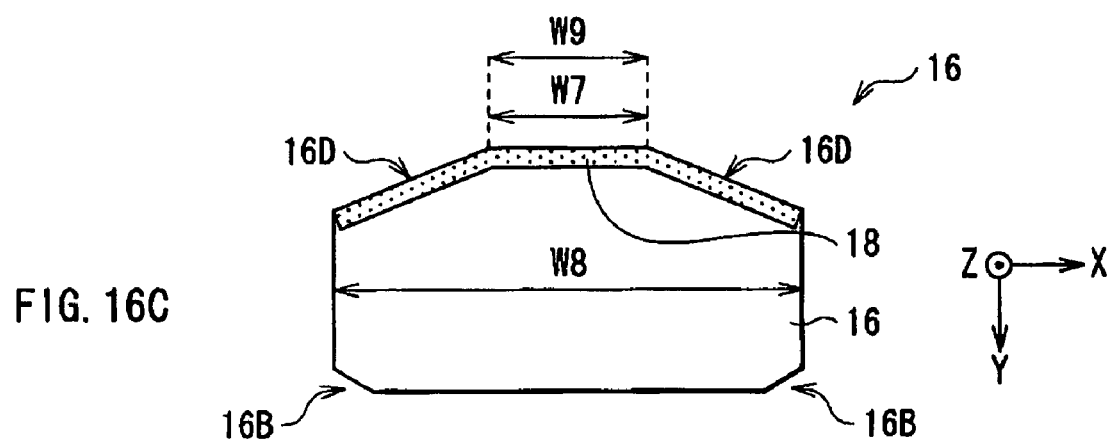
FIG. 16C is a plan configuration view further showing still another example of the LS layer 18 of FIG. 4B.
Figure 17A:
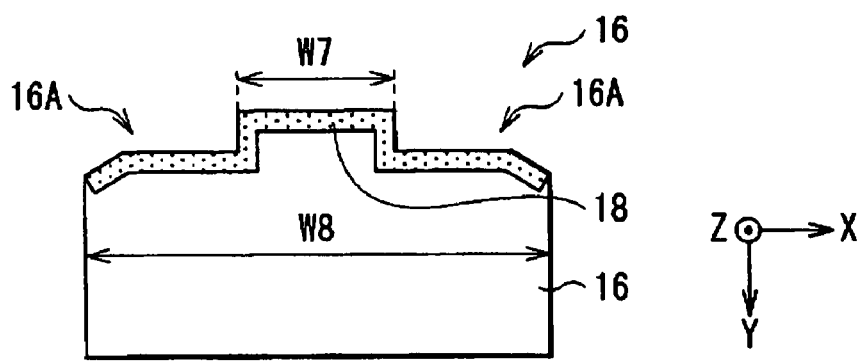
FIG. 17A is a plan configuration view further showing still another example of the LS layer 18 of FIG. 4B.
Figure 17B:
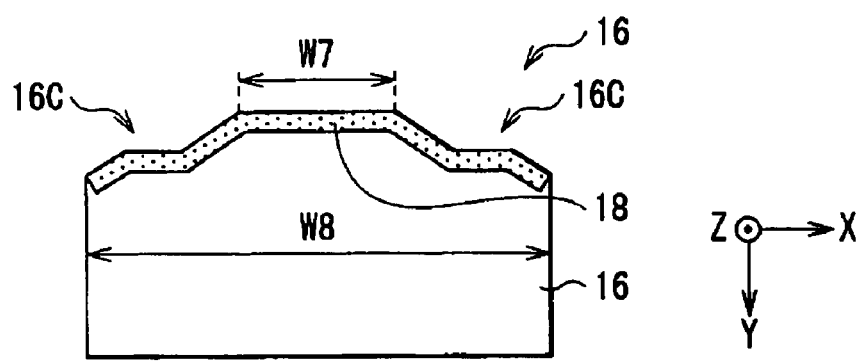
FIG. 17B is a plan configuration view further showing still another example of the LS layer 18 of FIG. 4B.
Figure 17C:
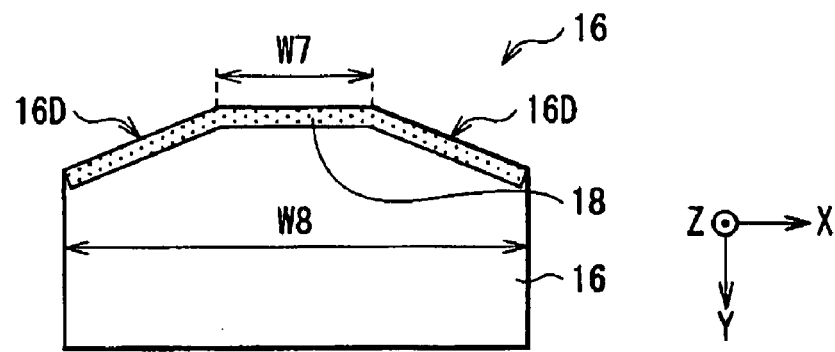
FIG. 17C is a plan configuration view further showing still another example of the LS layer 18 of FIG. 4B.

Here, almost a battledore shape indicates that, for example, in the upper shield lead shield layer 16, a width W7 on the air bearing surface side in the X-axis direction is smaller than a width W8 of the part recessed from the air bearing surface 9 in the X-axis direction. However, cutaway portions may be provided from the central area in the X-axis direction of the facing area of the magnetic recording medium 200, to both side faces orthogonal to the X-axis direction of the magnetic recording medium 200. Also cutaway portions may be provided as well from the central area in the X-axis direction of the part opposite to the facing area of the magnetic recording medium 200, to both side faces orthogonal to the X-axis direction of the magnetic recording medium 200. For example as shown in FIG. 12A, a pair of cutaway portions 16A may be provided in the following way. The central area in the X-axis direction of the facing area of the magnetic recording medium 200 is sandwiched by a pair of first end faces 16A1 extending orthogonal to the air bearing surface 9. Also, the pair of the first end faces 16A1 are sandwiched by a pair of second end faces 16A2 extending parallel to the air bearing surface 9 from the end faces opposite to the air bearing surface 9 of each of the first end faces 16A1. Finally, the pair of the second end faces 16A2 is sandwiched by a pair of third end faces 16A3 extending in the direction inclined to the air bearing surface 9 from the edges opposite to the first end faces 16A1 of each of the second end faces 16A2. A pair of cutaway portions 16B may be provided as well extending in the direction inclined to the air bearing surface 9, on both side faces in the X-axis direction of the part opposite to the facing area of the magnetic recording medium 200. In addition, for example as shown in FIG. 12B, cutaway portions 16C may be provided with a pair of the fourth end faces 16A4 in substitution for the pair of first end faces 16A1 of the cutaway portion 16A, extending in the direction inclined to the air bearing surface 9. Also, for example as shown in FIG. 12C, the pair of the cutaway portions 16D may be provided extending in the direction inclined to the air bearing surface 9, from the central area in the X-axis direction of the facing area of the magnetic recording medium 200, to both side faces orthogonal to the X-axis direction of the magnetic recording medium 200. Also as shown in FIGS. 13A to 13C, the pair of cutaway portions 16B are not provided, but only the cutaway portions 16A, 16C and 16D are provided.

The MR element 17 is a magnetoresistive element having a stacked structure with the magnetization free layer changing the magnetization direction according to the signal magnetic field from the magnetic recording medium 200, and is configured such that the sense current flows in the stacked direction. The MR element 17 performs the magnetic operation (reproduction) using, for example, Giant Magnetoresistive (GMR) effect or Tunneling Magnetoresistive (TMR) effect.

Moreover, the lower lead shield layer 12 is connected to a pad 12P, and the upper first lead shield layer 14 is connected to a pad 14P, both of them having a function of a current path to flow the current to the MR element 17. Thus the reproducing head portion 1A reads the recorded information using the change of the electrical resistance of the MR element 17 according to the signal magnetic field from the magnetic recording medium 200.

Next, the configuration of the recording head portion 1B will be described. As shown in FIGS. 3, 4A and 4B, the recording head portion 1B is formed on the upper second lead shield layer 16. The recording head portion 1B is a perpendicular magnetic recording head, or a so-called shield type head that, for example, a leading shield layer 18 (referred to as an LS layer 18, hereinafter) and the lower thin film coil 19 enclosed by insulating layers 20 to 23, the main magnetic pole layer 24 whose periphery is enclosed by an insulating layer 25, a gap layer 26, an auxiliary magnetic pole layer 27 and a write shield layer 28 whose peripheries are enclosed by a non-magnetic layer 29, an upper thin film coil 30 enclosed by insulating layers 31 and 32 and a return yoke layer 33 are stacked in this order. Moreover, the lower thin film coil 19 is connected to a pad 19P, and the upper thin film coil 30 is connected to a pad 30P. The pads 19P and 30P have a function of supplying the current to the lower thin film coil 19 and the upper thin film coil 30. The LS layer 18 corresponds to a specific example of the fourth magnetic shield layer of the present invention.

Here, the LS layer 18 absorbs the spread component of the magnetic flux before recording and suppresses the change of the write track width occurred with the change of the skew. The LS layer 18 is formed of magnetic metal materials such as nickel-iron alloy (NiFe). The above-mentioned skew means an angle of the magnetic head, inclined to the tangent of the circular track of the magnetic disk. The LS layer 18 is disposed between the main magnetic pole layer 24 and the upper second lead shield layer 16. Also the LS layer 18 is disposed adjacent to the lower thin film coil 19 on the air bearing surface 9 side and is coupled to the upper second lead shield layer 16. In addition, "coupled" means the magnetically conductible state.

As shown in FIGS. 3, 14A, 14B, 14C, 15A, 15B and 15C, the LS layer 18 may have a planar configuration of a rectangular shape so that the facing area of the magnetic recording medium 200 are entirely exposed on the air bearing surface 9. Or as shown in FIGS. 16A to 17C, the LS layer 18 may have a planar configuration of a letter U shape so that the LS layer 18 encloses the lower thin film coil 19 from the side faces and is partially exposed on the air bearing surface 9.

In addition, a plurality of dots are shown to easily distinguish the LS layer 18 from other parts, as in FIGS. 14A to 17C.

The lower thin film coil 19 generates the magnetic flux for leakage suppression in order to suppress leakage of the magnetic flux for recording (the unintentional spread of the magnetic flux for recording to the reproducing head portion 1A) occurred in the upper thin film coil 30. The lower thin film coil 19 is formed of high-conductive materials such as copper (Cu) and is disposed in the position recessed from the air bearing surface 9 as shown in FIG. 4B. The lower thin film coil 19 has a spiral structure wound about the back gap BG. A number of turns of the lower tin film coil 19 can be arbitrarily set, but it preferably corresponds to that of the upper thin film coil 30.

The insulating layer 20 is formed of the non-magnetic insulating materials such as aluminum oxide and aluminum nitride, and is formed on the upper second lead shield layer 16 of the position recessed from the air bearing surface 9. The insulating layer 21 is, for example, formed of non-magnetic insulating materials such as photoresist (photoconductive resin) showing fluidity by being heated, and spin on glass (SOG). The insulating layer 21 is formed on the insulating layer 20 and encloses the periphery of the lower thin film coil 19. The insulating layer 22 is formed of, for example, the same materials as the insulating layer 20, and encloses the periphery of the insulating layer 21. The insulating layer 23 is formed of, for example, the same materials as the insulating layer 20 and is formed on the surfaces of the LS layer 18, the lower thin film coil 19, the insulating layer 21 and the insulating layer 22. Thus the lower thin film coil 19 is electrically separated from its periphery by the insulating layers 20 to 23.

The main magnetic pole layer 24 is a portion to release the main magnetic flux and is formed of magnetic materials having a high saturated magnetic flux density such as iron-based alloy. The iron-based alloy is, for example, iron-cobalt alloy (FeCo), cobalt-iron-nickel alloy (CoFeNi) or the like.

Figure 18:
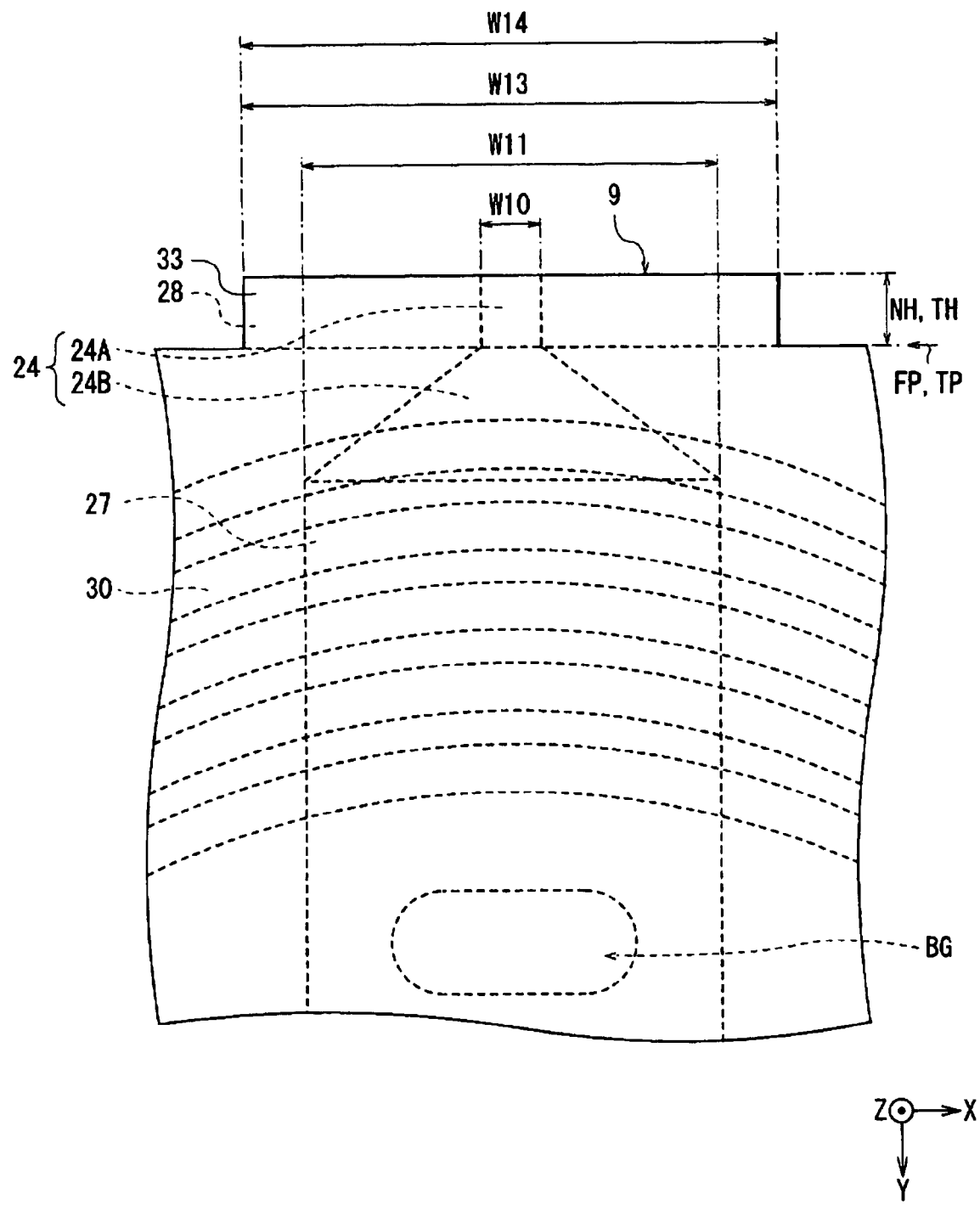
FIG. 18 is a plan configuration view showing an example of a main magnetic pole layer and the like of FIG. 4B.

As shown in FIGS. 4B and 18, the main magnetic pole layer 24 is formed extending from the air bearing surface 9 to the back gap BG, and is partially exposed on the air bearing surface 9. The main magnetic pole layer 24 has a planar configuration of almost a battledore shape. The main magnetic pole layer 24 has, in order from the air bearing surface side, a tip portion 24A extending in the Y-axis direction from the air bearing surface 9, and a rear end portion 24B coupled to the tip portion 24A and extending in the Y-axis direction from the tip portion 24A.

The tip portion 24A is a substantial portion to release the magnetic flux (that is, a magnetic pole), and has a uniform width W10 to define the recording track width. The rear end portion 24B supplies the magnetic flux to the tip portion 24A and has a width W11 larger than the width of the tip portion 24A in the X-axis direction. The width W11 of the rear end portion 24B in the X-axis direction is, for example, uniform at the part away from the tip portion 24A and is gradually decreased as approaching the tip portion 24A at the part close to the tip portion 24A of the rear end portion 24B. The position that the width of the main magnetic pole layer 24 begins to increase from the width W10 to the width W11 is a flare point FP. The distance between the air bearing surface 9 and the flare point FP is a neck height NH.

Figure 19:
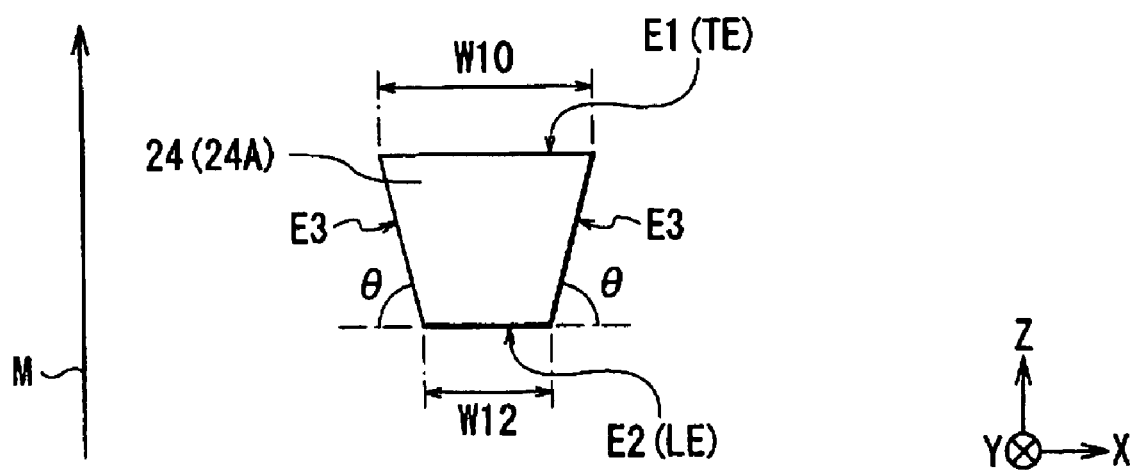
FIG. 19 is an enlarged side configuration view showing the portion exposed on the air baring surface of the main magnetic pole layer of FIG. 4B.

As shown in FIG. 19, the end face of the main magnetic pole layer 24 exposed on the air bearing surface is in a reverse trapezoid shape with a longer side located on the trailing side as a top and a shorter side located on the leading side as a bottom. More specifically, the end faces of the main magnetic pole layer 24 are defined by a top edge E1 (the width W10) located on the trailing side, a bottom edge E2 (the width W12) located on the leading side, and two side edges E3. The width W12 is smaller than the width W10. The top edge E1 is a substantial portion for recording of the main magnetic pole layer 24 (that is, a trailing edge TE), and the width W10 is approximately equal to or less than 0.2 µm. The bevel angle θ, that is, an angle between the extending direction of the bottom edge E2 and the side edges E3 can be arbitrarily set within a range below 90 degrees.

When an action of the magnetic recording medium 200 traveling toward the medium traveling direction M (the relative direction that the magnetic recording medium 200 travels with respect to the thin film magnetic head 1) is seen as a flow, the above mentioned "trailing side" means the side that the flow outflows from (the front side of the medium traveling direction M). Here, it is the upper side of the width direction (the Z-axis direction). On the other hand, the "leading side" means the side that the flow inflows to (the rear side of the medium traveling direction M). Here, it is the lower side of the width direction.

The insulating layer 25 electrically separates the main magnetic pole layer 24 from its periphery, and is formed of the non-magnetic insulating materials such as aluminum oxide ($Al_2O_3$) or aluminum nitride (AlN). The insulating layer 25 is provided on the insulating layer 23 and encloses the periphery of the main magnetic pole layer 24. Also, the insulating layer 25 has a groove of a letter U shape from the air bearing surface 9 to the edge on the air bearing surface side of the auxiliary magnetic pole layer 27. In the groove, the tip portion 24A (described later) of the main magnetic pole layer 24 is buried.

The gap layer 26 is formed of, for example, non-magnetic materials such as alumina, and is formed extending to the front edge of the auxiliary magnetic pole layer 27 from the air bearing surface 9, with a contact with the surface of the main magnetic pole layer 24. The portion sandwiched by the main magnetic pole layer 24 and the write shield layer 29 is a magnetic gap to magnetically separate the both, and the width of the gap is approximately between 0.03 µm and 0.1 µm.

The auxiliary magnetic pole layer 27 is a portion to accommodate the main magnetic flux, and is formed of magnetic materials having the high saturated magnetic flux density such as iron-based alloy. As shown in FIGS. 4B and 18, the auxiliary magnetic pole layer 27 is formed extending to the back gap BG from the position recessed from the air bearing surface 9. Like the rear end portion 24B of the main magnetic pole layer 24, the auxiliary magnetic pole layer 27 has a planar configuration of a rectangular shape with the width W11. Also, the auxiliary magnetic pole layer 27 is magnetically coupled to the main magnetic pole layer 24 and is disposed on the trailing side (the upper side in FIG. 4B) of the main magnetic pole layer 24. In addition, the auxiliary magnetic pole layer 27 may be disposed on the leading side of the main magnetic pole layer 24.

The write shield layer 28 absorbs the spread component of the magnetic flux conducted from the main magnetic pole layer 24 to the magnetic recording medium 200 in order to: (1) increase the magnetic field gradient of the recording magnetic field, (2) decrease the recording width, and (3) include the inclined magnetic field component in the recording magnetic field. The write shield layer 28 is disposed in an area in front of the auxiliary magnetic pole layer 27, and located in the same layer level as the auxiliary magnetic pole layer 27. The write shield layer 28 is separated from the main magnetic pole layer 24 by the gap layer 26, and extends to the position in front of the auxiliary magnetic pole layer 27 from the air bearing surface 9. Also, the write shield layer 28 is formed of magnetic materials such as permalloy or iron-cobalt based alloy. As shown in FIG. 18, the write shield layer 28 has a planar configuration of a rectangular shape with a width W13 larger than the width W11 of the auxiliary magnetic pole layer 27. At the rear edge, the write shield layer 28 is disposed adjacent to the non-magnetic layer 29 defining the throat height zero position TP. That is, the write shield layer 28 substantially takes a role to define the throat height zero position TP.

The non-insulating layer 29 defines the throat height zero position TP at the most front part and is formed of non-magnetic insulating materials such as aluminum oxide ($Al_2O_3$) or aluminum nitride (AlN), or non-magnetic conductive materials such as ruthenium. The distance between the air bearing surface 9 and the throat height zero position TP is the throat height TH. In addition, as in FIGS. 4B and 18, a case is shown where the throat height zero position TP corresponds to the flare point FP.

The non-magnetic layer 29 is disposed in front of the auxiliary magnetic pole layer 27, and located in the same layer level as the auxiliary magnetic pole layer 27. For example, the non-magnetic layer 29 is disposed between the auxiliary magnetic pole layer 27 and the write shield layer 28. Here, for example, the non-magnetic layer 29 is disposed in front of the auxiliary magnetic pole layer 27, and located in the same layer level as the auxiliary magnetic pole layer 27. Further, the non-magnetic layer 29 is disposed enclosing the periphery of the auxiliary magnetic pole layer 27.

The upper thin film coil 30 generates the magnetic flux for recording. The upper thin film coil 30 is formed of high conductive materials such as copper (Cu), and is disposed in the position recessed from the air bearing surface 9 as shown in FIG. 4B. The upper thin film coil 30 has a spiral structure wound about the back gap BG. Also, the upper thin film coil 30 is electrically connected to the lower thin film coil 19 through a via 35 so that the current flows in the direction opposite to the direction that the current flows in the lower thin film coil 19. In addition, a number of turns of the lower thin film coil 19 can be arbitrarily set, but it preferably corresponds to that of the upper thin film coil 30.

The insulating layer 31 is a base of the upper thin film coil 30, and is formed of the same non-magnetic insulating materials as the insulating layer 20. The insulating layer 32 covers the upper thin film coil 30 with the insulating layer 31, and is formed of, for example, the same non-magnetic insulating materials as the insulating layer 21. These insulating layers are disposed not to close the back gap BP, and are coupled to the non-magnetic layer 29. The most front parts of insulating layers 31 and 32 are, for example, recessed from the most front part of the non-magnetic layer 29.

Figure 20A:
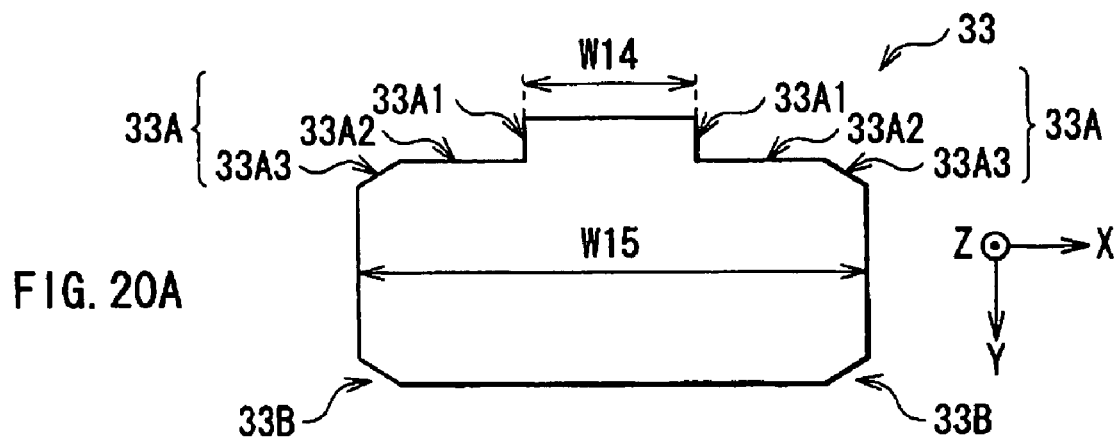
FIG. 20A is a plan configuration view showing an example of a return yoke layer 33 of FIG. 4B.

The return yoke layer 33 absorbs the magnetic flux after recording (the magnetic flux used for recording operation in the recording medium 200) and resupplies it to the main magnetic pole layer 24 and the auxiliary magnetic pole layer 27 so that the magnetic flux is circulated between the thin film magnetic head 1 and the recording medium 200. The return yoke layer 33 extends backward from the air bearing surface 9. The return yoke layer 33 is magnetically coupled to the write shield layer 29 on the side close to the air bearing surface 9, and is magnetically coupled to the auxiliary magnetic pole layer 27 on the side away from the air bearing surface 9. Also, the return yoke layer 33 is, for example, formed of the same magnetic materials as the write shield layer 29, and has a planar configuration of almost a battledore shape as shown in FIGS. 18 and 20A. In addition, FIG. 20A shows an example of a planar configuration of the return yoke layer 33.

Figure 20B:
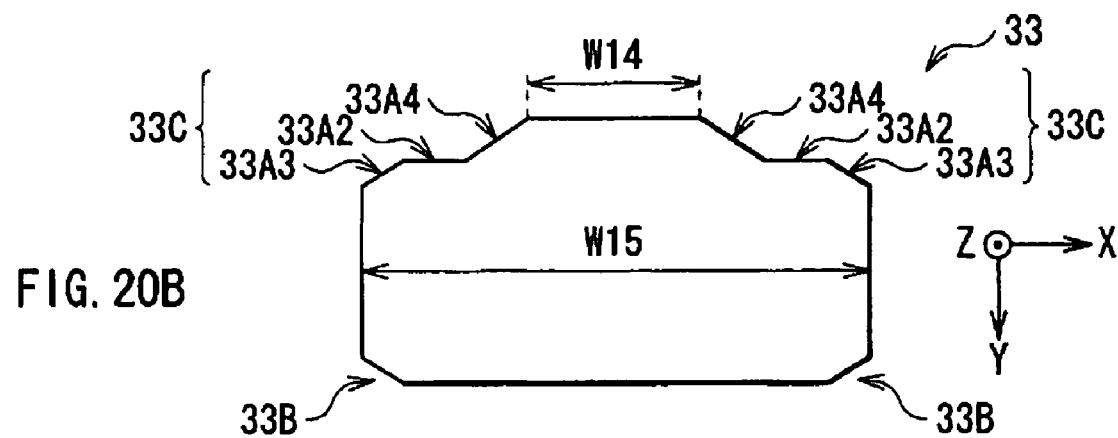
FIG. 20B is a plan configuration view showing another example of the return yoke layer 33 of FIG. 4B.
Figure 20C:
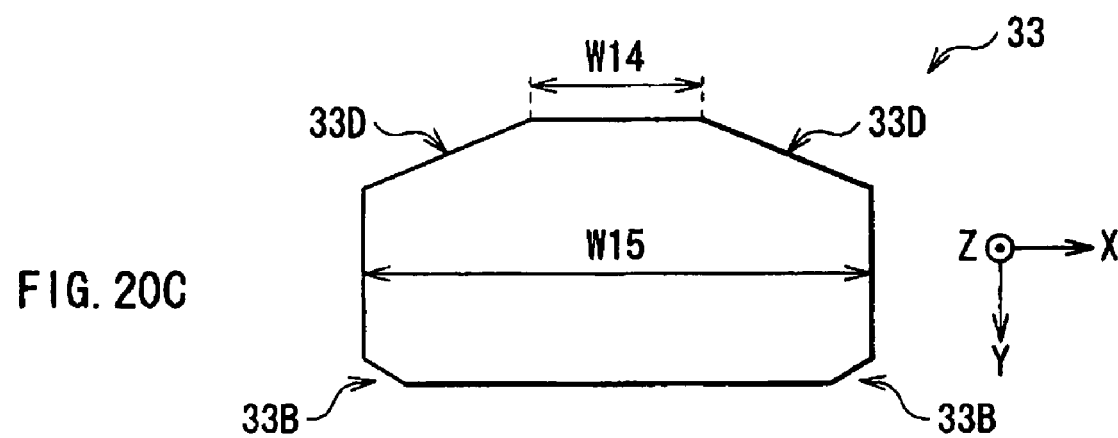
FIG. 20C is a plan configuration view showing still another example of the return yoke layer 33 of FIG. 4B.
Figure 21A:
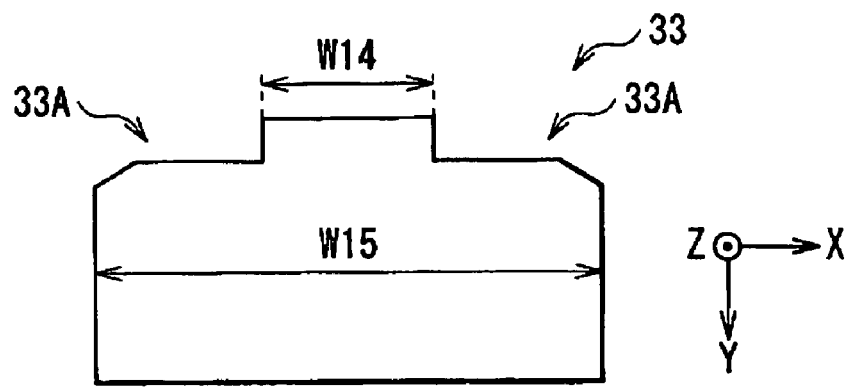
FIG. 21A is a plan configuration view further showing still another example of the return yoke layer 33 of FIG. 4B.
Figure 21B:
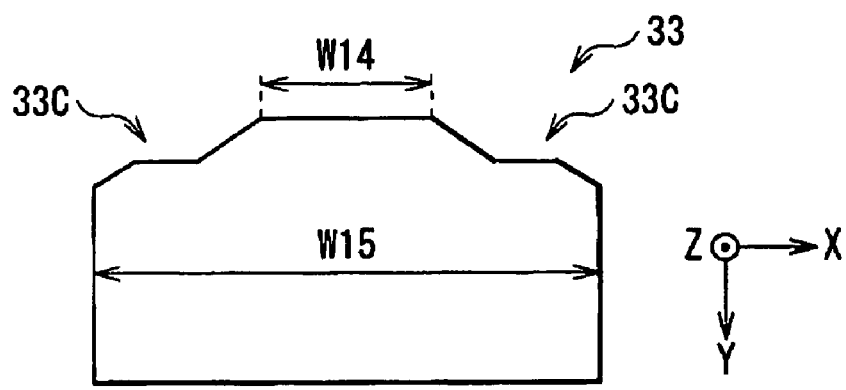
FIG. 21B is a plan configuration view further showing still another example of the return yoke layer 33 of FIG. 4B.
Figure 21C:
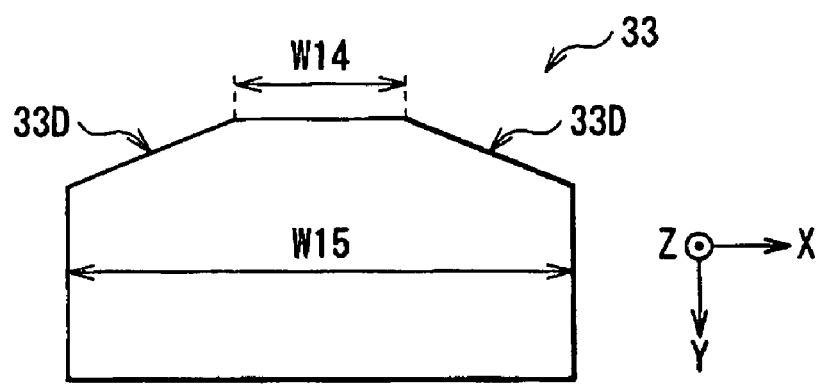
FIG. 21C is a plan configuration view further showing still another example of the return yoke layer 33 of FIG. 4B.

Here, almost a battledore shape indicates that, for example, in the return yoke layer 33, a width W14 of the edge in the X-axis direction on the air bearing surface side is smaller than a width W15 of the part recessed from the air bearing surface 9 in the X-axis direction. However, cutaway portions may be provided from the central area in the X-axis direction of the facing area of the magnetic recording medium 200, to both side faces orthogonal to the X-axis direction of the magnetic recording medium 200. Also cutaway portions may be provided as well from the central area in the X-axis direction of the part opposite to the facing area of the magnetic recording medium 200, to both side faces orthogonal to the X-axis direction of the magnetic recording medium 200. For example as shown in FIG. 20A, a pair of cutaway portions 33A may be provided in the following way. The central area in the X-axis direction of the facing area of the magnetic recording medium 200 is sandwiched by a pair of the first end faces 33A1 extending orthogonal to the air bearing surface 9. Also, the pair of the first end faces 33A1 are sandwiched by a pair of the second end faces 33A2 extending parallel to the air bearing surface 9 from the ends opposite to the air bearing surface 9 of each of the first end faces 33A1. Finally, the pair of the second end faces 33A2 are sandwiched by a pair of third end faces 33A3 extending in the direction inclined to the air bearing surface 9 from ends opposite to the first end faces 33A1 of each of the second end faces 33A2. A pair of cutaway portions 33B may be provided as well extending in the direction inclined to the air bearing surface 9 on both side faces in the X-axis direction of the part opposite to the facing area of the magnetic recording medium 200. In addition, for example as shown in FIG. 20B, cutaway portions 33C may be provided with a pair of the fourth end faces 33A4 in substitution for the first end faces 33A1 of the cutaway portion 33A, extending in the direction inclined to the air bearing surface 9. Also, for example as shown in FIG. 20C, the pair of the cutaway portions 33D may be provided extending in the direction inclined to the air bearing surface 9, from the central area in the X-axis direction to the magnetic recording medium 200, to both side faces orthogonal to the X-axis direction of the facing area of the magnetic recording medium 200. Also, for example as shown in FIGS. 21A to 21C, the pair of the cutaway portions 33B are not provided but only the cutaway portions 33A, 33C and 33D may be provided.

According to the embodiment, at least one of the width W1 or the width W4 in the X-axis direction of the largest part of the lower lead shield layer 12 and the width W2 or the width W6 in the X-axis direction of the largest part of the upper first lead shield layer 14 is smaller than the width W8 in the X-axis direction of the largest part of the upper second lead shield layer 16 and the width W15 in the X-axis direction of the largest part of the return yoke layer 33. For example, as schematically shown in FIG. 22, both of the width W1 or the width W4 and the width W2 or the width W6 are preferably smaller than the width W8 and the width W15.

Figure 22:
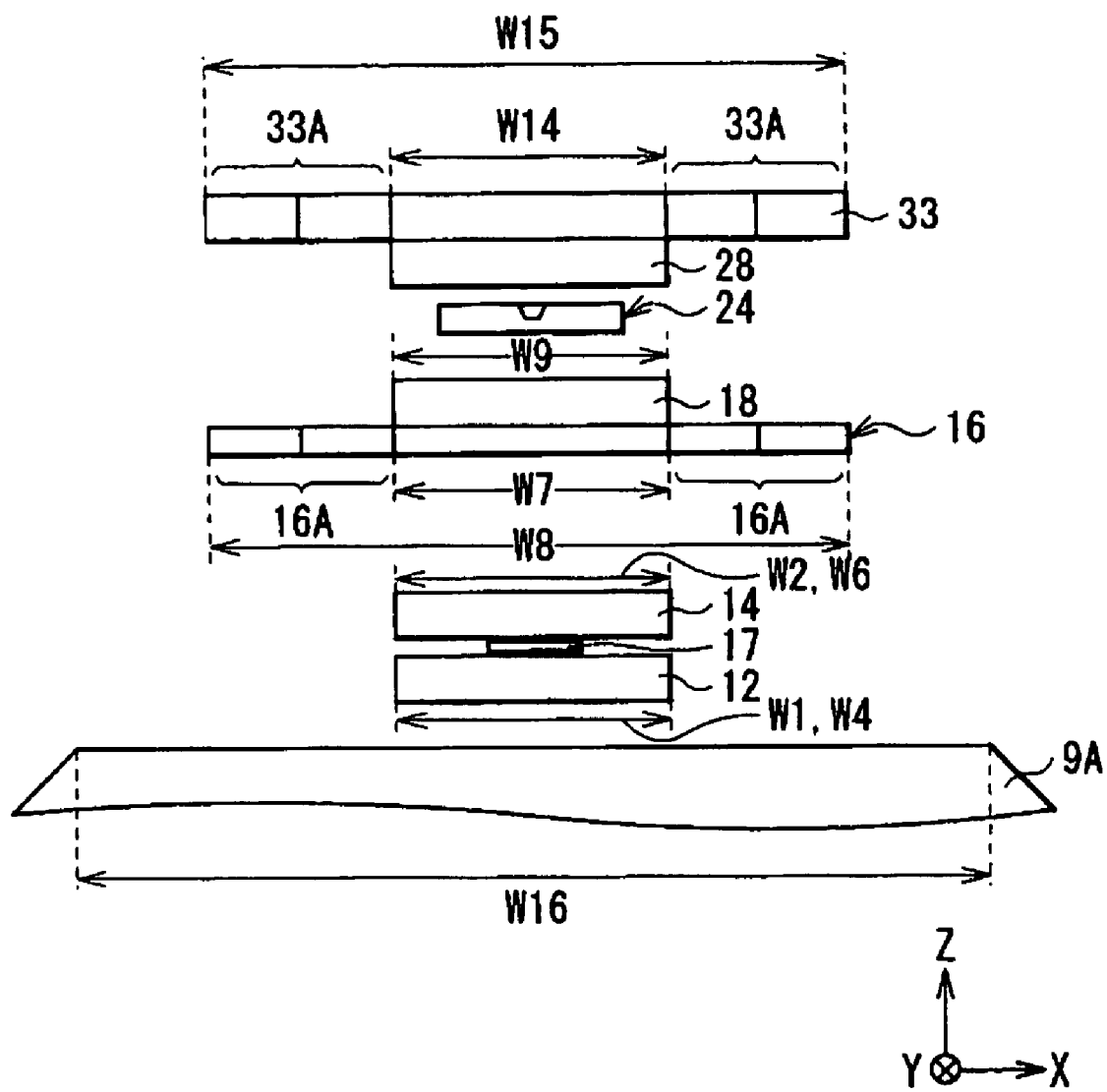
FIG. 22 is a side configuration view showing an example of a width of each component of the configuration of the thin film magnetic head of FIG. 3.
Figure 23:
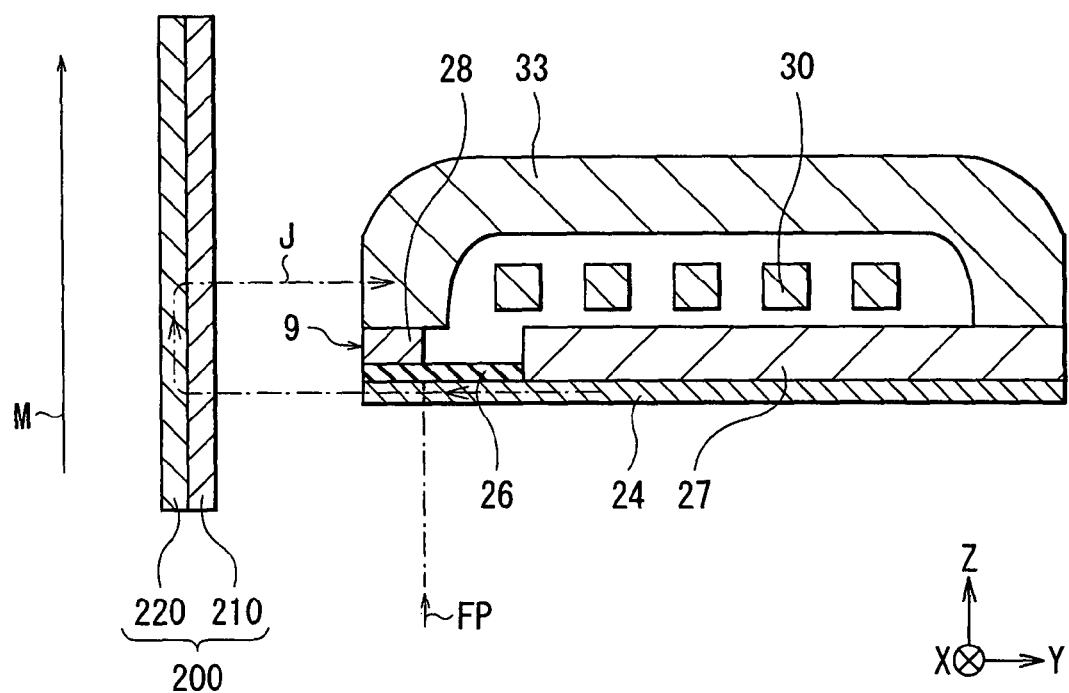
FIG. 23 is a cross sectional configuration view illustrating the relationship between the thin film magnetic head and the magnetic recording medium of FIG. 3

In FIG. 22, a case is shown where the width W1 is equal to the width W2 and the width W4 is equal to the width W6, respectively, but they may be different each other. In FIG. 22, a case is shown where the width W8 is equal to the width W15, but they may be different each other.

According to the embodiment, the width W1 or the width W3 in the X-axis direction of the exposed portion on the air bearing surface 9 of the lower lead shield layer 12, the width W2 or the width W5 in the X-axis direction of the exposed portion on the air bearing surface 9 of the upper first lead shield layer 14, the width W7 in the X-axis direction of the exposed portion on the air bearing surface 9 of the upper second lead shield layer 16, the width W9 in the X-axis direction of the exposed portion on the air bearing surface 9 of the LS layer 18, and the width W14 in the X-axis direction of the exposed portion on the air bearing surface 9 of the return yoke layer 33 preferably satisfy the following relation equation. The width of the exposed portion on the air bearing surface 9 is increased toward the lower lead shield layer 12 side from the return yoke layer 33 side so that disturbance (for example, the external magnetic field) in the depth direction (the opposite side of the air bearing surface 9) can be finally released to the lower lead shield layer 12 with the largest width of the exposed portion of the air bearing surface 9. In the width (width in the depth) recessed from the air bearing surface 9 of each layer, the above relationship is sufficiently satisfied.

$$(W1, W3) > (W2, W5) > W7 > W9 > W14 \quad \text{Equation (1)}$$

In addition, the width W1 or the width W4, the width W2 or the width W6, the width W7, the width W9 and the width W14 are preferably equal to each other. That is, all the widths of the lower lead shield layer 12, the upper first lead shield layer 14, the upper second lead shield layer 16, the LS layer 18 and the return yoke layer 33 that are exposed to the air bearing surface 9 are preferably equal to each other. Also in the above relation equation, (W1, W3) means the width W1 or the width W3 and (W2, W5) means the width W2 or the width W5.

According to the embodiment, as in FIG. 2, the rails 9A are provided on the air fearing surface 9. Thus in the central area in the track width direction (the X-axis direction) of the inflow side of the air flow in the slider 2A of the rail 9A, the width W16 (refer to FIG. 22) in the X-axis direction of the exposed portion on the air bearing surface 9 is larger than the width W1 or the width W3 of the lower lead shield layer 12, the width W2 or the width W5 of the upper first lead shield layer 14, the width W7 of the upper second lead shield layer 16, the width W9 in the X-axis direction of the exposed portion on the air bearing surface 9 in the upper write shield layer 21, the width W9 of the LS layer 18 and the width W14 of the return yoke layer 33. However, with consideration for the stability of fly height, the width W16 of the rail 9A is preferably as smaller as possible.

In addition, the magnetic recording medium 200 includes, for example, the magnetization layer 210 and the soft magnetic layer 220 in this order from the side close to the thin film magnetic head 1. The magnetization layer 210 is capable of magnetically recording of the information. The soft magnetic layer 220 has a function as a flux path of the magnetic flux in the magnetic recording medium 200. This type of the magnetic recording medium 200 is generally referred to as a double-layered recording medium for perpendicular recording. Needless to say, the magnetic recording medium 200 may include the magnetization layer 210 and the soft magnetic layer 220 that are mentioned above, and other layers as well.

The operation of the thin film magnetic head 1 is as follows. That is, when a current flows from an external circuit (not shown) to the lower thin film coil 19 and the upper thin film coil 30 of the recording head portion 1B during the information recording, the magnetic flux for recording is generated. The magnetic flux is accommodated in the auxiliary magnetic pole layer 27 and the main magnetic pole layer 24 and then flows to the tip portion 24A. At this time, because the magnetic flux is intensively focused at the flare point FP, the magnetic flux is finally concentrated at the vicinity of the tip portion 24A. The magnetic flux concentrated at the vicinity of the tip portion 24A is externally released so that the recording magnetic field is generated. Thus as in FIG. 23, the magnetization layer 21 of the magnetic recording medium 200 is magnetized by the recording magnetic field. Accordingly the information is magnetically recorded on the magnetic recording medium 200.

In this case, because the spread component of the magnetic flux released from the tip portion 24A is absorbed in the write shield layer 28 and the LS layer 18, the recording magnetic field gradient is increased. The magnetic flux absorbed in the write shield layer 28 is resupplied to the main magnetic pole layer 24 via the return yoke layer 33.

In addition, the magnetic flux released from the main magnetic pole layer 24 to the magnetic recording medium 200 magnetizes the magnetization layer 210 of the magnetic recording medium 200 and then is absorbed in the return yoke layer 33 via the soft magnetic layer 220. At this time, the magnetic flux is partially absorbed in the write shield layer 28 as well. The magnetic flux absorbed in the write shield layer 28 and the return yoke layer 33 are resupplied to the main magnetic pole layer 24. Thus the magnetic flux is circulated between the recording head portion 1B and the magnetic recording medium 200 so that the magnetic circuit is constructed.

On the other hand, during the information reading, when the sense current flows to the MR element 17 of the reproducing head portion 1A, the resistance value of the MR element 17 is changed according to the signal magnetic field for reproduction from the magnetic recording medium 200. The resistance change is detected as a voltage change so that the information recorded on the magnetic recording medium 200 is magnetically reproduced.

According to the embodiment, the upper second lead shield layer 16 is provided between the lower thin film coil 19 and the MR element 17, separately from the upper first lead shield layer 14. Thus the width W9 and the width W10 of the lower write shield layer 20 can be set without affecting the frequency band of the reproducing head portion 1A. Accordingly, the width W7 and the width W8 of the upper second lead shield layer 16 can be appropriately set so that the magnetic flux generated from the lower the film coil 19 and the main magnetic pole layer 24 can be prevented from being propagated to the MR element 17.

Also, at least one of the width W1 or the width W4 of the largest part of the lower lead shield layer 12 and the width W2 or the width W6 in the X-axis direction of the largest part of the upper first lead shield layer 14 is smaller than the width W8 in the X-axis direction of the largest part of the upper second lead shield layer 16 and the width W15 in the X-axis direction of the largest part of the return yoke layer 33. Thus the facing area of the lower lead shield layer 12 and the upper first lead shield layer 14 can be small.

In this way, in the present embodiment, the upper second lead shield layer 16 is provided between the lower thin film coil 19 and the MR element 17, separately from the upper first lead shield layer 14. Also, at least one of the width W1 or the width W4 of the lower lead shield layer 12 and the width W2 or the width W6 of the upper first lead shield layer 14 is smaller than the width W8 of the upper second lead shield layer 16 and the width W15 of the return yoke layer 33. Thus, while the influence of the magnetic flux generated in the lower tin film coil 19 and the main magnetic pole layer 24 on the MR element 17 is suppressed, the parasitic capacity generated by the lower lead shield layer 12 and the upper first lead shield layer 14 is also suppressed.

Also in the present embodiment, at least one of the width W1 or the width W4 of the lower lead shield layer 12 and the width W2 or the width W6 of the upper first lead shield layer 14 is smaller than the width W8 of the upper second lead shield layer 16 and the width W15 of the return yoke layer 33. It can be said that the width W8 of the upper second lead shield layer 16 and the width W15 of the return yoke layer 33 is larger than at least one of the width W1 or the width W4 of the lower lead shield layer 12 and the width W2 or the width W6 of the upper first lead shield layer 14. Accordingly, when the magnetic field components perpendicular to the air bearing surface 9 are absorbed in the upper second lead shield layer 16 and the return yoke layer 33, they are dispersed to ease the local concentration and the track erase can be suppressed. In case a heater to adjust the fly height is provided between the upper first lead shield layer 14 and the upper second lead shield layer 16, the heat releasing properties are improved by the upper second lead shield layer 16 and the return yoke layer 33. Also in case the upper second lead shield layer 16 and the return yoke layer 33 are necessarily shunted to the base 8, a path to shunt them to the base 8 is easily formed.

According to the present embodiment, in case the cutaway portions 16A, 16C and 16D of the upper second lead shield layer 16 are provided and the cutaway portions 33A, 33C and 33D of the return yoke layer 33 are provided, the magnetic field components perpendicular to the air bearing surface 9 can be eased from being locally concentrated on the edges of the upper second lead shield layer 16 and the return yoke layer 33. Thus the track erase can be suppressed.

According to the present embodiment, in case the width W1 or the width W3, the width W2 or the width W5, the width W7, the width W9 and the width W14 satisfy the above equation (1), that is, in case the width in the X-axis direction of the exposed portion on the air bearing surface 9 is gradually increased toward the lower lead shield layer 12 side from the return yoke layer 33 side, the external magnetic field can be released to the lower lead shield layer 12.

Further, in case the width W1 or the width W3, the width W2 or the width W5, the width W7, the width W9 and the width W14 satisfy the above equation (1), when the cutaway portions 12A, 12C and 12D are provided at least in the lower lead shield layer 12, the external magnetic field can be eased from being locally concentrated on the edges of the lower second lead shield layer 12. Thus the track erase can be suppressed.

Figure 24:
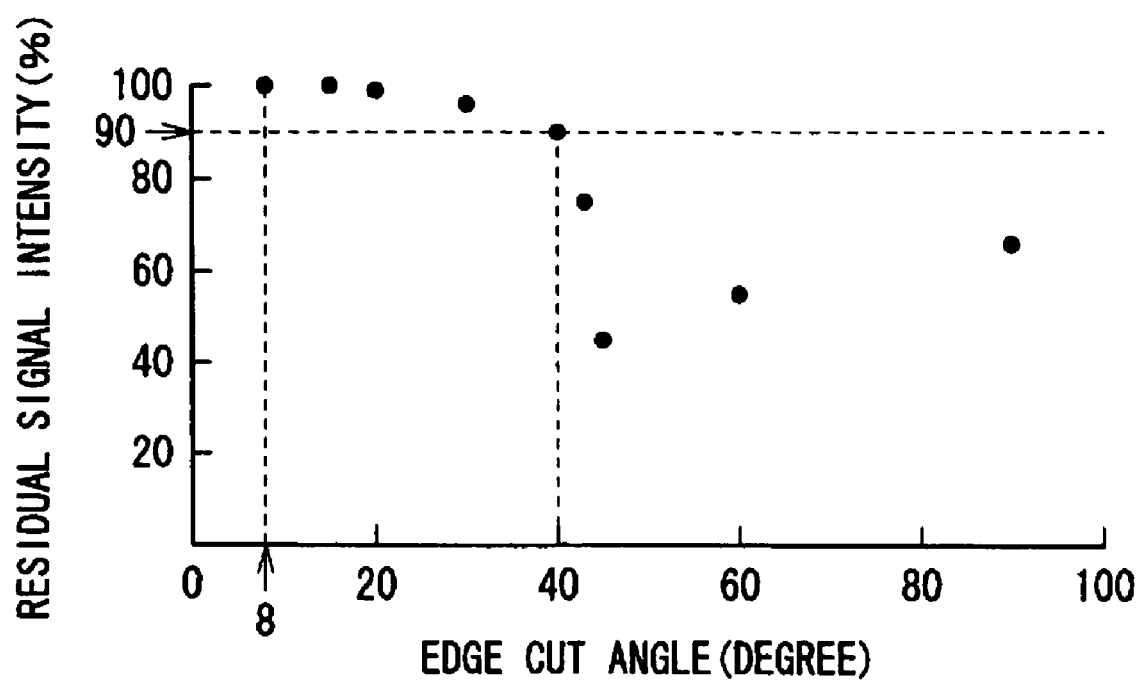
FIG. 24 is a relationship view showing the relationship between an edge cut angle and a residual signal intensity of a lower lead shield layer 12.

For example, in case the cutaway portions 12C or 12D is provided in the lower lead shield layer 12 as shown in FIGS. 7A, 8A, 10A and 11A, the residual signal intensity is measured close to the track edge after applying the external magnetic field of 100 Oe. As shown in FIG. 24, in case the angle (the edge cut angle $\phi$) between the end face (the end faces 12A4 and 12DA) extending from the central area in the X-axis direction of the facing area of the magnetic recording medium 200 of the lower lead shield layer 12 and the air bearing surface 9 is equal to or above 8 degrees and is equal to or below 40 degrees, the residual signal intensity is equal to or above 90%. When it is above 40 degrees, the residual signal density is sharply decreased. In case the edge cut angle $\phi$ is below 8 degrees and close to 0 degree, the substantial value of the edge cut angle $\phi$ is 90 degrees. Thus the residual signal intensity becomes remarkably small like the case of above 40 degrees. Accordingly it is understood that the edge cut angle $\phi$ of the lower lead shield layer 12 is set between 8 degrees and 40 degrees so that the track erase caused by the external magnetic field can be suppressed.

The present invention is described with the embodiments and examples, but it is not limited to these as various modifications are available. For example, an LS layer 34 and the lower thin film coil 19 are not necessarily provided.

What is claimed is:

1. A thin film magnetic head comprising:
    a magnetoresistive element having a stacked structure to detect a signal magnetic field from a magnetic recording medium;
    a first magnetic shield layer provided on one side of the magnetoresistive element in a stacked direction
    a second magnetic shield layer provided on the other side of the magnetoresistive element;
    a thin film coil generating a magnetic flux;
    a main magnetic pole layer provided on the opposite side of the first magnetic shield layer from the magnetoresistive element, the main magnetic pole layer conducting the magnetic flux to the magnetic recording medium so that the magnetic recording medium is magnetized in the direction orthogonal to its surface;
    a third magnetic shield layer provided between the main magnetic pole layer and the second magnetic shield layer; and
    a return yoke layer provided on the opposite side of the third magnetic shield layer from the main magnetic pole layer;
    each of the first magnetic shield layer, second magnetic shield layer, third magnetic shield layer, and return yoke layer including cutaway portions,
    wherein a width in a track width direction of at least one of the first and the second magnetic shield layers is smaller than widths in a track width direction of the third magnetic shield layer and the return yoke layer.

2. The thin film magnetic head according to claim 1,
    wherein each of the third magnetic shield layer and the return yoke layer has an exposed region in the center of the track width direction exposed to an air bearing surface.

3. The thin film magnetic head according to claim 2,
    wherein the second magnetic shield layer has an exposed region in the center of the track width direction exposed to an air bearing surface.

4. A head gimbal assembly comprising:
    a magnetic head slider provided with a thin film magnetic head of claim 1 on one side; and
    a suspension with the magnetic head slider attached on one end.

5. A head arm assembly comprising:
    a magnetic head slider provided with a thin film magnetic head of claim 1 on one side;
    a suspension with the magnetic head slider attached on one end; and
    an arm supporting the other end of the suspension.

6. A magnetic disk device comprising a magnetic recording medium and a head arm assembly,
    wherein the head arm assembly has a magnetic head slider provided with a thin film magnetic head of claim 1 on one side, and a suspension with the magnetic head slider attached on one end; and
    an arm supporting the other end of the suspension.

7. The thin film magnetic head according to claim 1, wherein at least one of the cutaway portions has a step-shape.

8. A thin film magnetic head comprising:
    a magnetoresistive element having a stacked structure to detect a signal magnetic field from a magnetic recording medium;
    a first magnetic shield layer provided on one side of the magnetoresistive element in a stacked direction
    a second magnetic shield layer provided on the other side of the magnetoresistive element;
    a thin film coil generating a magnetic flux;
    a main magnetic pole layer provided on the opposite side of the first magnetic shield layer from the magnetoresistive element, the main magnetic pole layer conducting the magnetic flux to the magnetic recording medium so that the magnetic recording medium is magnetized in the direction orthogonal to its surface;

a third magnetic shield layer provided between the main magnetic pole layer and the second magnetic shield layer; and a return yoke layer provided on the opposite side of the third magnetic shield layer from the main magnetic pole layer, wherein a width in a track width direction of at least one of the first and the second magnetic shield layers is smaller than widths in a track width direction of the third magnetic shield layer and the return yoke layer, the thin film coil has a lower thin film coil provided between the main magnetic pole layer and the third magnetic shield layer, and an upper thin film coil provided between the main magnetic pole layer and return yoke layer, and a fourth magnetic shield layer is provided between the main magnetic pole layer and the third magnetic shield layer on an air bearing side of the lower thin film coil, and coupled to the third magnetic shield layer.

9. The thin film magnetic head according to claim 8, wherein each of the fourth magnetic shield layer and at least one of the first and the second magnetic shield layers has an exposed region in the center of the track width direction exposed to an air bearing surface, and the width in the track width direction of the exposed region of at least one of the first and the second magnetic shield layers is substantially equal to or smaller than that of the exposed region of the fourth magnetic shield layer.

10. The thin film magnetic head according to claim 9, wherein each of the first to the fourth magnetic shield layer and the return yoke layer has an exposed portion to the air bearing surface, widths in the track width direction of the exposed portions being equal to each other, and the first and the second magnetic shield layer is smaller than the third and the fourth magnetic shield layers and the return yoke layer in total width in the track width direction.

11. The thin film magnetic head according to claim 9, wherein each of the first to the fourth magnetic shield layer and the return yoke layer has an exposed portion exposed to the air bearing surface, widths in the track width direction of exposed portions being gradually increased toward the first magnetic shield layer side from the return yoke layer side.

12. The thin film magnetic head according to claim 11, wherein at least the first magnetic shield layer of the first to the fourth magnetic shield layer and the return yoke layer have chamfered faces extending backward from both ends of the exposed region in the track width direction to the outside, and the angle between the air bearing surface and the chamfered face is equal to or above 8 degrees and equal to or below 40 degrees.

\* \* \* \* \*